(12) United States Patent
Vion-Dury et al.

(10) Patent No.: US 7,543,015 B2
(45) Date of Patent: Jun. 2, 2009

(54) SYMMETRICAL STRUCTURAL PATTERN MATCHING

(75) Inventors: Jean-Yves Vion-Dury, Saint Ismier (FR); Emmanuel Pietriga, Saint Ismier (FR)

(73) Assignee: Xerox Corporation, Norwalk, CT (US)

( * ) Notice: Subject to any disclaimer, the term of this patent is extended or adjusted under 35 U.S.C. 154(b) by 830 days.

(21) Appl. No.: 10/046,314

(22) Filed: Jan. 16, 2002

(65) Prior Publication Data

US 2003/0191847 A1    Oct. 9, 2003

(51) Int. Cl.
G06F 15/16      (2006.01)
G06F 7/00       (2006.01)
G06F 17/30      (2006.01)
G06F 9/44       (2006.01)

(52) U.S. Cl. .............................. 709/200; 707/6; 717/124
(58) Field of Classification Search ........................ None
See application file for complete search history.

(56) References Cited

U.S. PATENT DOCUMENTS

| 4,794,528 | A  | * | 12/1988 | Hirose et al. ................... | 707/6   |
| 5,530,863 | A  | * | 6/1996  | Hino .......................... | 717/146 |
| 6,122,757 | A  | * | 9/2000  | Kelley ......................... | 714/39  |
| 6,487,566 | B1 | * | 11/2002 | Sundaresan .................. | 715/513 |
| 6,748,588 | B1 | * | 6/2004  | Fraser et al. ................. | 717/146 |
| 6,789,116 | B1 | * | 9/2004  | Sarkissian et al. ........... | 709/224 |
| 6,828,963 | B1 | * | 12/2004 | Rappoport ................... | 345/419 |

OTHER PUBLICATIONS

"Balise Reference Manual", AIS Software, 1998, available on the Internet at: <http://balise.xoasis.com/doc/balref/index.htm>.
Dennis S. Arnon, "Scrimshaw: A language for document queries and transformations", EP '94: Proceedings of the Fifth International Conference on Electronic Publishing, Document Manipulation and Typography, 1993.
Haruo Hosoya and Benjamin C. Pierce, "XDuce: *A typed XML processing language*", in Proceedings of Third International Workshop on the Web and Databases (WebDB2000), vol. 1997 of Lecture Notes in Computer Science, pp. 226-244, May 2000.

(Continued)

*Primary Examiner*—John B. Walsh
(74) *Attorney, Agent, or Firm*—Oliff & Berridge, PLC

(57) ABSTRACT

The invention provides a pattern matching technique based on the symmetrical construction of the code structures representing the matching expression and the filter to be matched. The method of the invention is for determining whether a computer-storable expression matches a filter. A first code structure representing the expression is evaluated for determining a value of the expression. A second code structure representing the filter is analyzed for determining the characteristics of the filter. Then, the value is filtered according to the filter characteristics. The first code structure is constructed from a plurality of first programming language code structure elements and the second code structure is constructed from a plurality of second programming language code structure elements. Each second structure element corresponds to one of the first structure elements. This symmetrical construction of both code structures enables an arbitrary level of structural complexity. The matching operation may be invoked explicitly.

14 Claims, 5 Drawing Sheets

OTHER PUBLICATIONS

"XSL Transformations (XSLT)", Version 1.0, W3C Recommendation Nov. 16, 1999, available on the Internet at:<http://www.w3.org/TR/xslt>.

"XML-QL: A Query Language for XML", Submission to the World Wide Web Consortium Aug. 19, 1998, available on the Internet at: <http://www.w3.org/TR/NOTE-xml-ql/>.

"XML Path Language (XPath)", Version 1.0, W3C Recommendation, Nov. 16, 1999, available on the Internet at: <http://www.w3.org/TR/xpath>.

"Quilt: an XML Query Language", Mar. 31, 2000, available on the Internet at: <http://www.almaden.ibm.com/cs/people/chamberlin/quilt_euro.html>.

"ML for the Working Programmer," Lawrence C. Paulson, Cambridge University Press, pp. v-xi and 130-133, 1997.

Sandra A. Mamrak, Michael J. Kaelbling, Charles K. Nicholas, Michael Share, "Chameleon: A System for Solving the Data-Translation Problem", in IEEE Transaction on Software Engineering, pp. 1090-1108, vol. 15, No. 9, Sep. 1989.

* cited by examiner

SYMMETRICAL STRUCTURAL PATTERN MATCHING

CROSS-REFERENCE TO RELATED APPLICATION

Cross-reference is made to U.S. patent applications Ser. No. 10/046,191, entitled "Bi-Valuation Of Programming Statements", which is assigned to the same assignee as the present invention and incorporated herein by reference.

BACKGROUND OF THE INVENTION

1. Field of the Invention

The invention generally relates to pattern matching techniques in programming languages and in particular to a method and system for determining whether a computer-storable expression matches a filter.

2. Description of the Related Art

Presently, several techniques have been developed for string pattern matching. The most fundamental underlying theory, i.e. that of regular languages and recognition automatons, has been widely applied in areas ranging from text processing to DNA sequence searches. Expressions describing string patterns are today still loosely integrated with general purpose scripting languages such as Python or Perl, because of their convenience for solving recurrent string related problems such as pattern extraction or replacement.

With the increasing importance of structured information processing, and especially of complex structural transformations involved in data and document interchanges, the growing trend is to propose specialized query or transformation languages that strongly integrate pattern matching facilities. As long as complex structures are considered, e.g. trees or even graphs, language theorists and designers are again looking for expressive, powerful, simple, clear and precise formalisms in order to capture the most fundamental matching operations. However, the richness of complex data structures induces richer transformation requirements, and general solutions for specifying general pattern matching at the right abstraction level have not yet been proposed. Such general pattern matching technique would however be required for application to a broad class of programming languages.

SUMMARY OF THE INVENTION

Given the problems of the existing technologies, it would therefore be advantageous to provide a method and system that enable the specification of matching operations on various and arbitrary complex data structures while keeping the amount of basic building blocks reasonably small.

It would further be advantageous to provide a pattern matching technique that is based on explicit and restricted assumptions, so that it can be embedded into existing or future, specialized or general purpose programming languages.

Further it would be advantageous to provide a pattern matching method and system having underlying syntax and semantics defined on an unambiguous basis and within an extensible and flexible theoretic framework.

Moreover, it would be advantageous to provide an improved pattern matching technique of great simplicity and high expressive power.

The present invention has been made in consideration of the above situation and provides a method, and article of manufacture therefor, of operating a computer system for determining whether a computer-storable expression matches a filter. A first code structure that represents the expression is evaluated for determining a value of the expression. A second code structure that represents the filter is analyzed for determining the characteristics of the filter. The first code structure is constructed from a plurality of first programming language code structure elements and the second code structure is constructed from a plurality of second programming language code structure elements, where each second structure elements corresponds to one of the first structure elements. The value of the expression is then filtered according to the determined filter characteristics.

The present invention further provides a computer system capable of determining whether a computer-storable expression matches a filter. The computer system comprises processing means for evaluating a first code structure that represents the expression for determining a value of the expression, analyzing a second code structure that represents the filter for determining the characteristics of the filter, and filtering the value according to the filter characteristics. The first code structure is constructed from a plurality of first programming language code structure elements and the second code structure is constructed from a plurality of second programming language code structure elements. Each second structure element corresponds to one of the first structure elements.

BRIEF DESCRIPTION OF THE DRAWINGS

The accompanying drawings are incorporated into and form a part of the specification to illustrate several embodiments of the present invention. These drawings, together with the description, serve to explain the principles of the invention. The drawings are only for the purpose of illustrating alternative examples of how the invention can be made and used and are not to be construed as limiting the invention to only the illustrated and described embodiments. Further features and advantages will become apparent from the following and more particular description on the various embodiments of the invention as illustrated in the accompanying drawings, wherein.

DETAILED DESCRIPTION

Figure 1:
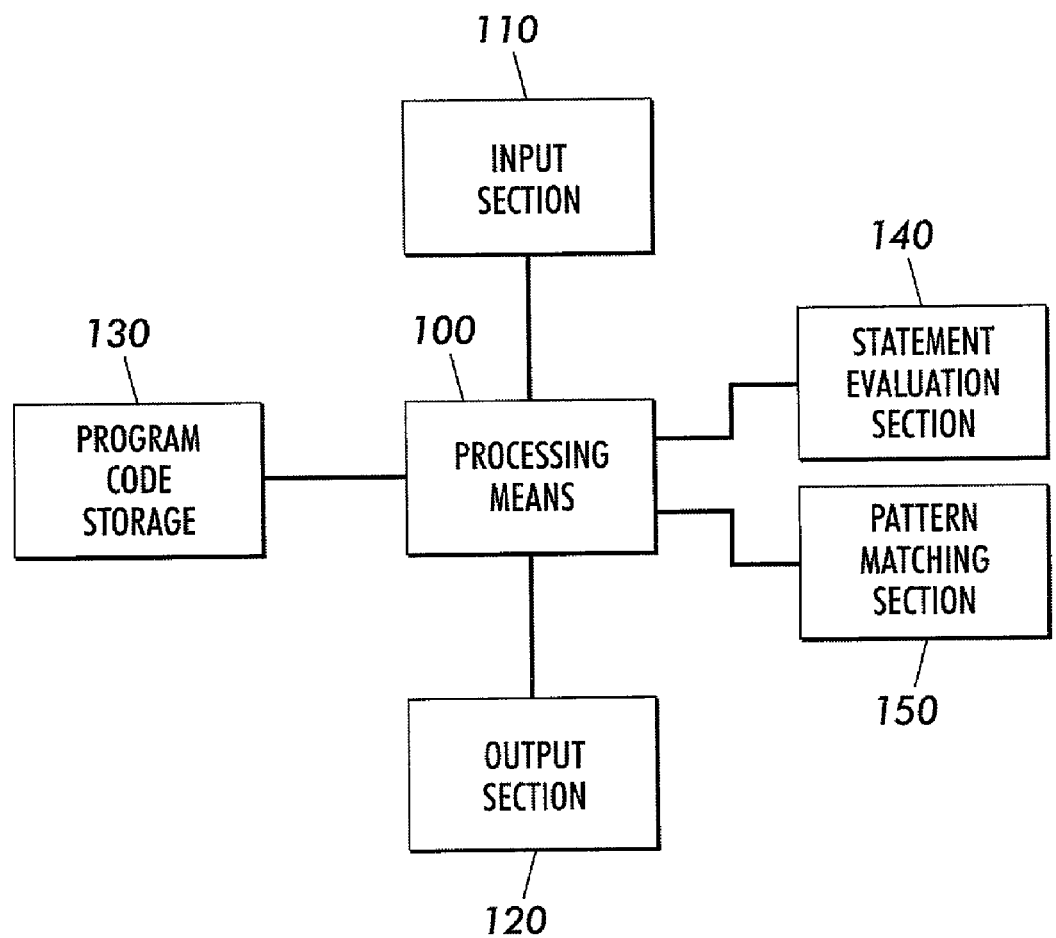
FIG. 1 illustrates a computer system according to the invention.

Referring now to the drawings and particularly to FIG. 1, which illustrates a computer system of the present invention, processing means 100 is provided that is connected to an input section 110 and an output section 120. The processing means 100 can be of any type and has access to a program code storage 130 that stores the programming language statements and expressions that are operated on by the invention. The system further comprises in the example shown in FIG. 1, a statement evaluation section 140 and a pattern matching section 150 including instructions that allow the processing means 100 to operate as discussed in more detail below.

General Syntax and Operational Semantics

Before going into the details of the invention, an example of a general abstract syntax for terms of the underlying language is provided, where the notation of e encompasses imperative and declarative statements. Operational semantics is described by using the SOS style described in G. D. Plotkin's article "A structural approach to operational semantics", Technical Report DAIMI-FN-19, Computer Sciences Dept., Århus university, Denmark, 1981, considering "small step" transition in order to cover an eventual extension to concurrent languages with interleaving semantics.

The first set of definitions is now provided that describe basic constructs that can be considered as universal.

| | |
|---|---|
| e ::= n \| s \| true \| false | constants: numerics, strings, booleans |
| none \| unit | distinguished values |
| e ★ e | basic operations ($\star \in \{+, -, *, /\}$) |
| if $e_1$ then $e_2$ else $e_3$ | boolean choice |
| var x = e.e | variable declaration |
| x | variables |
| e ::= true \| false | boolean literals |
| e == e \| e != e | equality and difference comparisons |

The construction for the introduction of local variables var x=e in e is often noted let x=e in e in functional language communities.

More sophisticated computation structures, e.g. sequencing, loops and assignment, with widely understood semantics are described through the following grammar extension:

| | |
|---|---|
| e ::= e;e | sequence |
| x := e | simple assignment to a variable |
| *(e) | closure computation |

A transition system describes an interpreter of the language through a transition relation which defines the computation of any expression e into a new expression e', and is noted e→e'. Several computation steps such as e→e'→e'' can be abbreviated by using the notation e↠e''. By definition, terminating computations will reduce e to a normal value noted v which cannot be reduced anymore; this particular computation step is noted e→o v, and a derivation chain that reduces to a normal value is noted e↠o v. The relation →o is formally described through:

$$\frac{e \to e' \quad e' \twoheadrightarrow e''}{e \to\!\!\circ\ e'} \text{ or } \frac{e \to e' \quad \neg(e' \to e'')}{e \to\!\!\circ\ e'} \quad [norm].$$

The formal semantics of basic boolean, string and arithmetic operations (noted ★ above) will not be described here, being considered as widely understood.

The computing environment, as well as the use and notation of variables and references will now be described in more detail. The computing environment, noted S, is a mapping from names (of variables) into reduced values:

$S = \{x_i^v\}$.

with $x_i^v$ being a denotation for the mapping of a unique label $x_i$ into a unique reduced value $v_i$. Reference handling requires also another execution structure, a heap $H = \{r_i^v\}$ using the same notation provided that r denotes references. The introduction of recursive procedures or functions with non-lazy evaluation would simply require a stack of mappings in order to handle local environments. The entire environment H, S is sometimes abbreviated by Γ.

In another notation, the computing environment is noted Γ as the mapping from variable names into reduced values:

$\Gamma = \{x_o^v, \ldots, x_k^v\}$

Further, $\Gamma, x^v$ is an abbreviation of $H, S \cup \{x^v\}$, or $\Gamma \cup \{x^v\}$, respectively, and similarly $\Gamma, r^v$ is an abbreviation of $H \cup \{r^v\}$, S. The transition relation becomes now Γ⊢e→Γ'⊢e' in the general case, although invariant execution structures can be skipped for clarity when required. This relation means "expression e computed in environment H, S becomes e' in environment H', S'", understood that H' and S' can be equal to or different from H and S. The following equations describe the semantics of variable access [var] and declaration [d1,d2]:

ti $\Gamma, x^v \vdash x \to \Gamma, x^v \vdash v$ [var]

$$\frac{\Gamma \vdash e_1 \to \Gamma' \vdash e_1'}{\Gamma \vdash \text{var } x = e_1 \cdot e_2 \to \Gamma' \vdash \text{var } x = e_1' \cdot e_2} \quad [d1]$$

$$\frac{\Gamma \vdash e_1 \to\!\!\circ\ \Gamma \vdash v}{\Gamma \vdash \text{var } x = e_1 \cdot e_2 \to \Gamma, x^v \vdash e_2} \quad [d2]$$

Reference creation and dereferencing involve intermediate distinguished values r (references) on which no other operations are defined, as opposed to pointers and pointer arithmetics.

$$\frac{\Gamma \vdash e \to \Gamma' \vdash e'}{\Gamma \vdash @e \to \Gamma' \vdash @e'} \quad [ref1]$$

$$\frac{\Gamma \vdash e \to \Gamma' \vdash e'}{\Gamma \vdash !e \to \Gamma' \vdash !e'} \quad [dref1]$$

Γ⊢@v→Γ,r^v⊢r[ref2]  Γ,r^v⊢!r→Γ,r^v⊢v[dref2]

In [ref2], it is to be mentioned that a new unique reference r is created in the Heap and that this reference is returned as result of the computation of @v.

In the testing operation, environment modifications are allowed during evaluation of the boolean part. This enables the use of a matching operation as a condition for the test.

$$\frac{\Gamma \vdash e_1 \to \Gamma' \vdash e_1'}{\Gamma \vdash \text{if } e_1 \text{ then } e_2 \text{ else } e_3 \to \Gamma' \vdash \text{if } e_1' \text{ then } e_2 \text{ else } e_3} \quad [if]$$

if true then $e_2$ else $e_3 \to e_2$ [if1] if false then $e_2$ else $e_3 \to e_3$ [if2]

The semantics of the basic numerical operations +, /, *, − is well known in the art. The + operator is polymorphic, i.e. it applies in various semantics to numerals, strings, sequences, concatenations, multisets, disjunctive unions, i.e. $m_1 + m_2 - m_2 = m_1$, and dictionaries (non-commutative, right priority).

Pattern Matching

The pattern matching technique, which will now be described in more detail, evaluates a first code structure that represents an expression, analyzes a second code structure that represents the filter to be matched by the expression, and filters the value determined by evaluating the first code structure according to filter characteristics determined by the second code structure. The first code structure, hereafter denoted "data structure" and the second code structure, hereafter denoted "pattern structure", are constructed symmetrically so that matching operations can be specified on various and arbitrary complex data structures, such as strings, sequences, sets, dictionaries and records, but also on trees, DAGs (Directed Acyclic Graphics) and general graphs. This will be shown in more detail hereafter.

In the following, it is assumed that it is possible to declare local variables which will potentially be assigned to parts of or to the entire filtered structures. Expressions, such as e, $e_i$ can be literal constants, variables or basic operations, such as e+e, e*e. References are considered because they allow the sharing of substructures and the modeling of DAGs and graphs.

Pattern matching operations make it possible to check a given expression e for whether the expression contains a structural pattern, and to extract a part of its content, in a single operation. A pattern matching operation is made up of three parts: The first part is an expression e against which the filter is to be checked. This part is called the subject. The second and third parts are the pattern-matching operator # and the filter f. The subject can be a variable, a constant, or a more complex expression that will be evaluated prior to matching.

Thus, a pattern matching operation looks like
e#f.

These operations return a boolean value. If the operation succeeds, meaning that the expression matches the filter and, optionally, that variables have been assigned to a part of the subject's content, then it returns true. If it fails, meaning that the expression did not match the filter structure or that it did not contain a given value, then false is returned.

Figure 3:
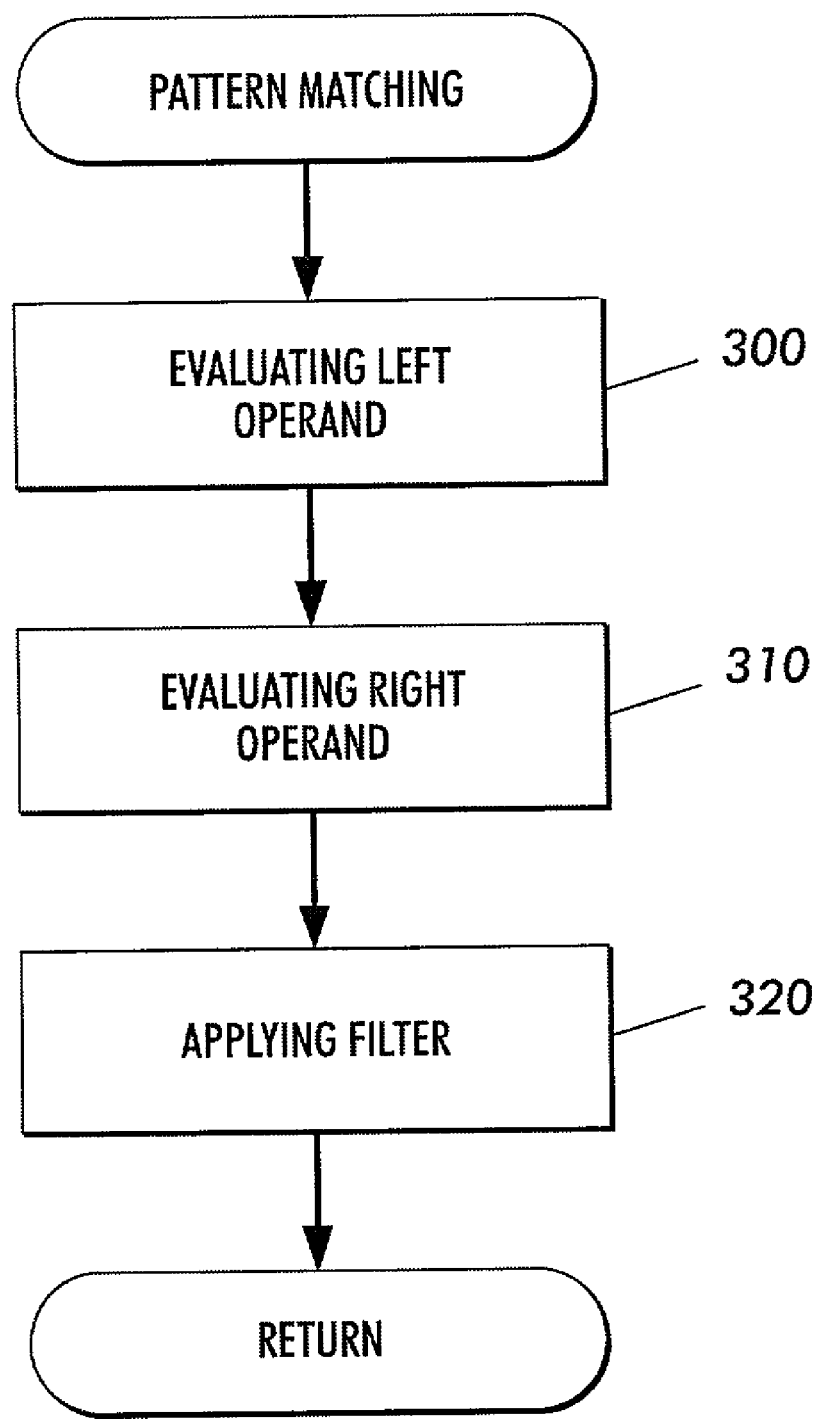
FIG. 3 is a more particular flow chart illustrating the pattern matching technique of the invention.

By convention, normal values are noted v or n, s if they are numeric or strings, respectively. As shown above, a derivation chain that reduces to a normal value is noted e→→o v. The general semantics of the matching operation e#f requires in the following order: the evaluation (step 300 in FIG. 3) of the left operand e (normalized to v), the evaluation (step 310) of the right operand, i.e. the filter f, and the application (step 320) of the filter to the normalized value, which returns either true or false. It will be appreciated that the term "value" does not necessarily relate to a numeric value as the expression may be a non-numeric expression. Moreover, the environment might be modified by the matching operation, whatever result is obtained. Normalized filters are noted as bold letters. The formal semantics of matching operation is twofold. The first stage computes a reduced form first for the subject ([match1] iterated) and then for the filter ([f-match1] iterated):

$$\frac{\Gamma \vdash e \to \Gamma' \vdash e'}{\Gamma \vdash e \sharp f \to \Gamma' \vdash e' \sharp f} \quad [match1]$$

$$\frac{\Gamma \vdash f \to \Gamma' \vdash f'}{\Gamma \vdash v \sharp f \to \Gamma' \vdash v \sharp f'} \quad [f\text{-}match1]$$

The last stage, i.e. the filter application itself, depends on the filter and data structure considered and will be defined case by case in the following.

Examples of structure constructors are now presented in order to illustrate the symmetry between them and the corresponding filter constructors described below. The structure constructors and filter constructors are indicator elements indicating the respective data type:

| | |
|---|---|
| $\{e_1, e_2, \ldots\}$ | Multiset: a collection type in which elements are not ordered and which can contain multiple instances of the same value |
| $[e_1, e_2, \ldots]$ | Sequence: an ordered collection of elements of a common type |
| $<e_1, e_2, \ldots>$ | Tuple: an ordered collection of elements which has a fixed size. Elements need not be of a common type |
| $<name_1 = e_1, name_2 = e_2, \ldots>$ | Record: an unordered collection of named elements |
| $\{key_1 = e_1, key_2 = e_2, \ldots\}$ | Dictionary: an unordered collection of elements that are each accessed by a key. Each key must be unique |
| @ (e) | References: a reference to a value (itself computed from an expression e) stored in memory |
| ! | De-referencing operator, used to access a referenced value |

Further, there is provided a + operator that can take different semantics depending on the data structure, e.g. arithmetic addition, string concatenation, set union, etc.

Filters are expressed using a small number of operators and can describe many different structures. Besides this, filters closely resemble the structures to be matched, making them rather easy to specify. Filters can match sequences, multisets, tuples, records, dictionaries, strings and any combination of these structures. All filters are built using three basic filter operators, in addition to filter constructors which use the same notation as their data constructor counterparts. The three basic filter operators are the test operator, the existence operator and the assignment operator.

The test operator, noted % in the present example, is used in conjunction with a constant, variable or complex expression, which will be evaluated prior to matching. It tests the occurrence of the value given by its operand at some point in the structure. For instance, e # %'circus' tests whether e is a string equal to 'circus' or not.

e # [%(2+2), %3]

checks that e is a sequence having one item of value 4 and one item of value 3 in that order.

The existence operator, noted ?, is defined as 'match any element'. For instance, e # <?,?> matches any tuple that has exactly two elements, like
  <'circus', 47>.

The assignment operator, noted ?x, where x is a variable name, is used to extract a part of the subject and assign this part to x. For instance, e # <%'circus',?,?y> will succeed if e is a tuple containing three elements. The first element has to be the string 'circus', the second one can be anything, and the value of the third element is assigned to variable y. The same pattern matching operation on a sequence would be very similar:

e # [%'circus',?,?y]

changing only the constructor from tuple to sequence.

In addition to these basic filter operators, there is provided a concatenation operator, noted ++, that combines compatible elements. It can be seen as the dual operator of the concatenation operator (noted +, see above) of data structures. For instance, the string 'circus' can be thought of as the concatenation of three substrings 'ci'+'r'+'cus'.

In a symmetrical way, the filter appears as e # % 'ci' ++ %'r' ++ %'cus'.

For finding strings containing character 'r', the filter

? ++ %'r' ++ ?

can be used, which means zero or more elements, plus the letter 'r', and a further zero or more element. This operator can be used with any structure, making it possible to take other elements into account. For instance, e # [?x] matches only sequences consisting of exactly one element, and assigns this element to x. To express the fact that a sequence e must contain at least one element, without any ordering, ? combined with the ++ operator can be used:

e # ? ++ [?x] ++ ?.

For illustrating the advantages of the present structural pattern matching scheme, more complex examples are now given for strings, tuples, sequences, records, multisets and dictionaries.

e # ? ++ %'r' ++?x will match any string containing 'r' and assign the substring beginning after the first occurrence of 'r' to variable x; if e-'circus', then x will be assigned 'cus'; if e='red', then x will be assigned 'ed'.

e # [<f1=?x>] ++ ?

will match any sequence containing one record as the first element. This record must contain a field f1; the value of this field will be assigned to variable x.

[<f1=10>,<f2='s'>,<f1=3>] # [<f1=?x>]++?y will succeed; x will be assigned 10 and y will be assigned [<f2='s'>, <f1=3>].

e # {? ++ [<?, ?x>]} ++ ?

will match any multiset containing at least one sequence whose elements are tuples made up of two elements and will assign the second element of the last tuple of a sequence in this multiset to variable x. It will select the last tuple of a sequence because the pattern structure includes ? ++ [<?, ?x>] instead of [<?, ?x>] ++ ? which would have selected the first tuple.

{'ab', 'cd', 'ef'} # {%'ef',%'ab',%'cd'} will match since the order is irrelevant in sets.

Pattern matching can further be used to retrieve values from a dictionary. Suppose a dictionary which maps some strings to some sequences, dict # {'k1'=?} ++ ?

will succeed if dict contains a key 'k1', and dict # {'k2'=?x} ++ ?

will succeed if dict contains key 'k2' and will assign the corresponding sequence to variable x.

Since pattern matching operations return boolean values, they can be composed using logical connectors. It is then possible to express filters which succeed only if the subject does not match the filter, or complex filters. There are three composition operators, "not", "or" and "and".

"not" will succeed if the subject does not match the filter. For instance, e # not (? ++ %'r' ++ ?)

will succeed only if string e does not contain the character 'r'.

"or" takes two filter arguments, which are matched from left to right. For instance e # %'c' ++ ? or ? ++ %'r' ++ ?

will succeed only if string e begins with the character 'c' or if it contains the character 'r'.

"and" works in a similar way as "or". It succeeds if the expression matches both filters. For instance, e # <?,?> and ?x allows checking that e is a two-element tuple and assigns e to x.

There are also provided "Kleene" operators * and $^+$ that work with the known semantics, "zero or more elements" and "at least one element", respectively. For instance, e # %'abb' ++ (%'c')* ++ %'dee' will match any of the following strings: 'abbdee', 'abbcdee', and 'abbcccdee'. The same filter using the second operator, e # %'abb' ++ (%'c')$^+$ ++ %'dee' will match the same set of strings except 'abbdee'. The Kleene operators can be used with sequences, sets and dictionaries.

As shown above, the described pattern matching technique enables the symmetrical constructions of both pattern matching structures and data structures, so that they reach the same arbitrary level of structural complexity. Further, the matching operation is invoked explicitly, through a dedicated operator. The general form of the structure to be matched is tested as well as the contained (sub-)structures and the assignment of part(s) of the matching structure to variable(s) of the execution environment.

The technique relates to a number of fields including those of language construction, control abstractions and transformations models, rewriting systems theory, term rewriting systems, transformation languages or systems for compilation and language processing, structured document transformation, tree pattern matching, explicit or automatic document transformation systems, and so on.

Further, the technique may serve for building transformation models which are less abstract and more general, than rewrite systems, which perform implicit pattern matching and apply built-in strategies for rule application. The technique is on the other hand abstract enough to simplify and extend general purpose programming languages. Thus, the technique may play an important role in the design of new transformation techniques or the extension of existing ones.

Four basic topics are addressed in a single approach different to and independent from existing ones that are currently and conceptually less efficient: the definition of a data model, the definition of matching operations, the definition of a transformation model, and the integration of the transformation model in a programming language.

The definition of a data model is to give a precise form to the notion of data structures, which need to be rich and clear for the programmer but at the same time kept as simple as possible. The computational properties of each kind of structure should be stressed to reach completeness at minimal cost. For instance, sequences are ordered structures that are useful for handling stacks, fifo's, or to memorize intermediate nodes when walking through a tree, whereas multisets are useful for managing "bags" of unorganized data.

The technique described above proposes a "universal" data model based on a synthesis of the most commonly used data types. These are chosen in order to avoid redundancy and to enable the construction of heterogeneous structures of arbitrary complexity while being kept simple and explicit. However, applying the technique does not require using exactly the proposed type set, but only applying the symmetrical construction principle, both to data structures and to pattern structures.

Figure 2:
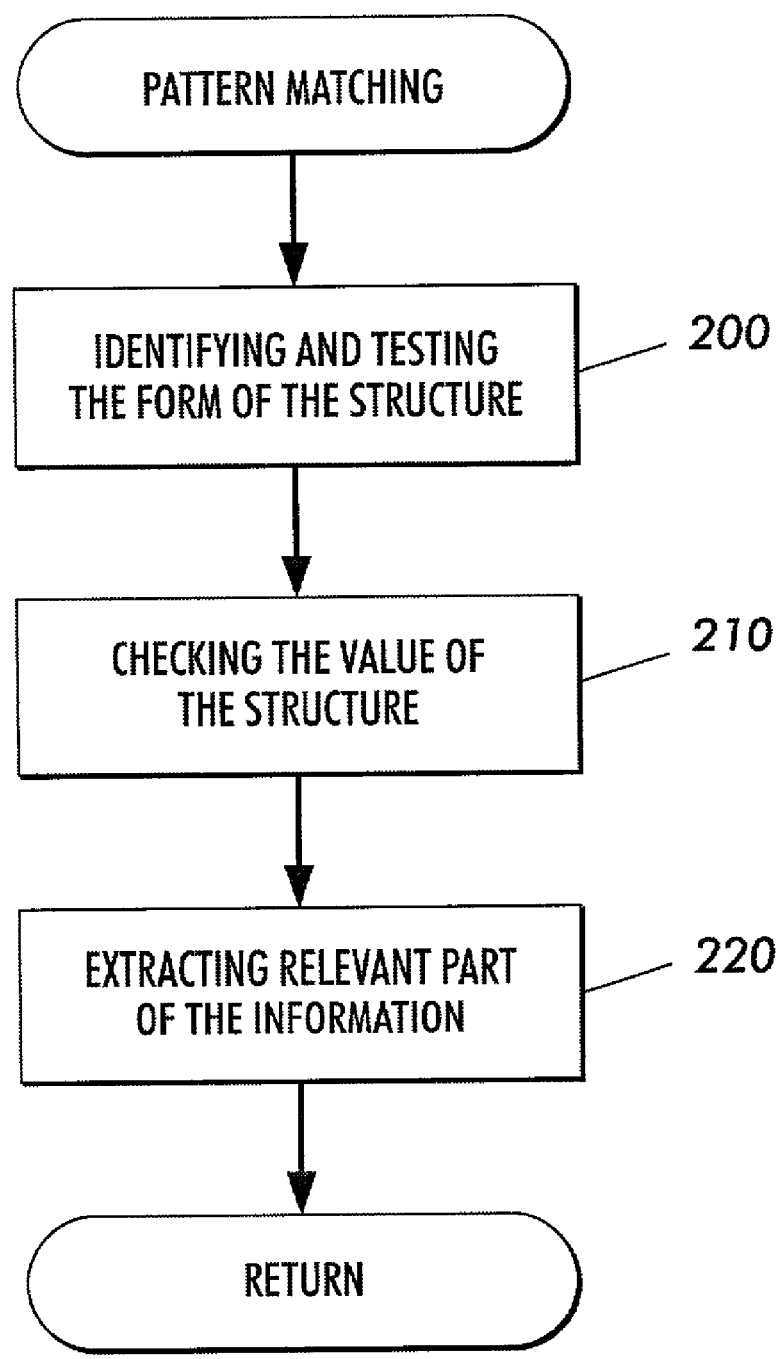
FIG. 2 is a general flow chart illustrating the pattern-matching technique of the invention.

The definition of matching operations is clearly related to the previous point. This covers three fundamental issues: identifying and testing the "form" of the structure, (step 200 in FIG. 2); check the value of the structure (or a part of it) (step 210); and extracting a part of the information stored in the structure (step 220).

The technique allows for building pattern matching structures in such a way that the required form is made explicit, thus clear to the programmer who specifies it. Parts of the subject structure which are not of interest are abstracted through a basic existence filter noted "?". Values inside the structure can be checked as equal to arbitrary complex values, thanks to a basic testing filter noted "%", e being a potentially complex expression. Finally, information located in the subject structure can be extracted and copied to any variable that is available in the execution environment, by using a basic assignment filter, noted "?x", where x is a variable name.

The definition of a transformation model starts from the finding that matching operations are just intermediate steps of realistic structure transformation processes and should therefore be put in a more general context: How are transformation steps described, chained and ordered? How are structures scanned and what is the result of the overall transformation? How is the contextual information extracted that is used during matching operations: is it simply transferred into the output structure(s) and/or does it drive the transformation itself?

The explicit invocation of the matching operation, according to the present technique, allows one to see it as a boolean evaluation. The transformation model can therefore take an useful form, depending on the requirements. The transformations can cascade matching operations by using rules like $e_1$ # $f_1 \Rightarrow e_2$ # $f_2 \Rightarrow \ldots$ , or composed sequentially or through complex networks of "if-then-else" statements, possibly comprising computation on the extracted context. Output structures, the result of the transformation, are constructed in a coherent way by using the available data models and contextual information, possibly transformed by other computational means.

Depending on the definition of the transformation model and the expected computational power of the transformation, one can consider either to extend the pattern matching with language constructs to specify internal computation, as a complement to matching operations, or to integrate the transformation model itself into a more general programming language, as an extension which increases expressiveness. Both options are made possible by this technique, thanks to the explicit matching operator and the few general, and modular, assumptions regarding the underlying language.

Considering the above observations, it will be appreciated that the described pattern matching technique is in particular suited for supporting general typing mechanisms. Type checking improves the global reliability of programming languages, and provides efficient means for runtime optimization.

Pattern Matching Syntax and Operational Semantics

As noted above, the general abstract syntax uses e for expressions and f for pattern matching filters. Matching operations are invoked through the operator e # f where the left expression e is the subject and the right operant f is the filter or pattern.

There are provided four basic operators plus combinators (or filter connectors):

| | |
|---|---|
| f ::= ? | existence test |
| ?x | existence test and assignment to variable x |
| %e | equality check |
| @ f | ref. filter |
| f ::= f ++ f | filter composition |
| f* \| f⁺ | kleene-like operators |
| f and f \| f or f \| not f | boolean (ordered) connectives |

The first two filters ? and ?x are under normal form. The computation of the equality check and of reference filters requires the computation of their embedded expression:

$$\frac{e \to e'}{\%e \to \%e'} \, [f\text{-}anti]$$

$$\frac{f \to f'}{@f \to @f'} \, [f\text{-}@]$$

By using a meta symbol ★ ∈ {++, and, or}, we define a family of equations valid for all binary combinators:

$$\frac{f_1 \to f_1'}{f_1 \star f_2 \to f_1' \star f_2} [f\text{-}left]$$

$$\frac{f_2 \to f_2'}{f_1 \star f_2 \to f_1 \star f_2'} [f\text{-}right]$$

The reduction of the kleene-like operator f* preserves the structure of the filter ([f*]) whereas the computation of f⁺ is a pure rewriting ([f⁺]):

$$\frac{f \to f'}{f^* \to f'^*} [f^*]$$

f⁺→f++f*[f⁺]

In the semantics of filter application (matching), v and w denote reduced terms:

ti v#?→true[m-free2]  Γ,x$^v$⊢w#?x→Γ,x$^w$⊢true[m-free1]

$$\frac{\Gamma, r^v \vdash v \sharp f \to \Gamma', r^v \vdash \text{true}}{\Gamma, r^v \vdash r \sharp @f \to \Gamma', r^v \vdash \text{true}} [m\text{-}@] \quad \frac{v_1 = v_2 \to \text{true/false}}{v_1 \sharp \%v_2 \to \text{true/false}} [m\text{-}\%]$$

It is to be mentioned that [m-%] uses again the structural equality on structures. This last is defined for all considered structures as $s_1 = s_2$ iff $s_1 \subseteq s_2$ and $s_1 \supseteq s_2$. The inclusion itself is straight forward for strings, sequences and multisets; for dictionaries, it corresponds to the inclusion of key/value pairs.

The composition combinator ++ applies only to strings, sequences, multisets or dictionaries. It can be abstracted over these various data structures, noted s, by using the + operator which models concatenation for strings and sequences, disjoint union for multisets and non-commutative union for records and dictionaries. As keys must be unique in a dictionary, the key/value pairs of the right hand operand override the key/value pairs of the left hand operand, if required. This does not impact the semantics of the related matching operation. The following definition uses again the equality relation on structures:

$$\frac{\exists s_1, s_2 \mid s_1 + s_2 = s \quad s_1 \sharp f_1 \to \text{true} \quad s_2 \sharp f_2 \to \text{true}}{s \sharp f_1 ++ f_2 \to \text{true}}[m\text{-}fadd1]$$

$$\forall s_1, s_2 \text{ such that } s_1 + s_2 = s \begin{cases} \dfrac{s_1 \sharp f_1 \to \text{false}}{s \sharp f_1 ++ f_2 \to \text{false}}[m\text{-}fadd2] \\ \dfrac{s_1 \sharp f_1 \to \text{true} \quad s_2 \sharp f_2 \to \text{false}}{s \sharp f_1 ++ f_2 \to \text{false}}[m\text{-}fadd3] \end{cases}$$

Similarly, in the following definition which applies only to strings, sequences, sets and dictionaries, the term $\epsilon$ is an abstraction over empty string, empty sequence, empty set and empty dictionary:

$$\text{if } s \neq \varepsilon \quad \frac{\exists s_1, s_2 \mid s = s_1 + s_2 \quad s_1 \sharp f \to \text{true} \quad s_2 \sharp f^* \to \text{true}}{s \sharp f^* \to \text{true}}[m^*]$$

$$\epsilon \sharp f^* \to \text{true}\,[m^*b]$$

In the following equation, the order of operands is important, and computing environments can be altered by unsuccessful operations. This enables more efficient implementations since no specific processing is required in order to preserve the original environment:

$$\frac{\Gamma \vdash v \sharp f_1 \to \Gamma' \vdash \text{true} \quad \Gamma' \vdash v \sharp f_2 \to \Gamma'' \vdash \text{true}}{\Gamma \vdash v \sharp f_1 \text{ and } f_2 \to \Gamma'' \vdash \text{true}}[m\text{-}and1]$$

$$\frac{\Gamma \vdash v \sharp f_1 \to \Gamma' \vdash \text{false}}{\Gamma \vdash v \sharp f_1 \text{ and } f_2 \to \Gamma' \vdash \text{false}}[m\text{-}and2]$$

$$\frac{\Gamma \vdash v \sharp f_1 \to \Gamma' \vdash \text{true} \quad \Gamma' \vdash v \sharp f_2 \to \Gamma'' \vdash \text{false}}{\Gamma \vdash v \sharp f_1 \text{ and } f_2 \to \Gamma'' \vdash \text{false}}[m\text{-}and3]$$

A similar behavior is defined for "or" filters:

$$\frac{\Gamma \vdash v \sharp f_1 \to \Gamma' \vdash \text{true}}{\Gamma \vdash v \sharp f_1 \text{ or } f_2 \to \Gamma' \vdash \text{true}}[m\text{-}or1]$$

$$\frac{\Gamma \vdash v \sharp f_1 \to \Gamma' \vdash \text{false} \quad \Gamma' \vdash v \sharp f_2 \to \Gamma'' \vdash \text{true}}{\Gamma \vdash v \sharp f_1 \text{ or } f_2 \to \Gamma'' \vdash \text{true}}[m\text{-}or2]$$

$$\frac{\Gamma \vdash v \sharp f_1 \to \Gamma' \vdash \text{false} \quad \Gamma' \vdash v \sharp f_2 \to \Gamma'' \vdash \text{false}}{\Gamma \vdash v \sharp f_1 \text{ or } f_2 \to \Gamma'' \vdash \text{false}}[m\text{-}or3]$$

Similarly, the "not" filter is:

$$\frac{\Gamma \vdash v \sharp f_1 \to \Gamma' \vdash \text{true/false}}{\Gamma \vdash v \sharp \text{ not } f_1 \to \Gamma' \vdash \text{false/true}}[m\text{-}not]$$

Of course, backtracking might be convenient in cases where the matching failed and still let the environment changed. Further, a solution by the mean of an explicit restoring operation v(f), may have semantics $$\frac{f \to f'}{V(f) \to V(f')}[f\text{-}V]$$

$$\frac{\Gamma \vdash v \sharp f \to \Gamma' \vdash \text{true}}{\Gamma \vdash v \sharp V(f)) \to \Gamma' \vdash \text{true}}[m\text{-}Va]$$

$$\frac{\Gamma \vdash v \sharp f \to \Gamma' \vdash \text{false}}{\Gamma \vdash v \sharp V(f) \to \Gamma \vdash \text{false}}[m\text{-}Vb]$$

The symmetrical construction of data and filter structures will now be described in more detail in the examples of tuples, sequences, multisets, dictionaries and records.

Tuples allow to handle heterogeneous structures of fixed length. The present description will present only constructors. Other common operations on tuple structures are: access to items through indexing notations such as t[i], in order to fetch the $i^{th}$ item, or assignment t[i]:=e, in order to set the $i^{th}$ item, provided that i corresponds to the actual size of the tuple. Tuples are particularly useful for computing Cartesian products such as done in relational algebra and related languages:

| | |
|---|---|
| e ::= <$e_0, \ldots, e_k$> | tuple construction (k + 1 items) |
| f ::= <$f_0, \ldots, f_k$> | filter for tuples of k + 1 elements |

In the following part, $\tilde{e}$ is noted as a shorthand for $e_0, \ldots, e_k$. The computation of a tuple (or a filter tuple) is defined by the successive computation of all subterms, in the order of occurrence. A tuple or filter tuple is reduced when all subterms or sub-filters are reduced:

$$\frac{e_i \to e'_i}{\langle v_0, \ldots, e_i, \ldots, e_k \rangle \to \langle v_0, \ldots, e'_i, \ldots, e_k \rangle}[tuple]$$

$$\frac{f_i \to f'_i}{\langle f_0, \ldots, f_i, \ldots, f_k \rangle \to \langle f_0, \ldots, f'_i, \ldots, f_k \rangle}[f\text{-}tuple]$$

Matching for tuples is performed by matching all subfilters to corresponding substructures. If the subject v is not a tuple, or if cardinalities are different, the operation returns "false" ([m-tuple]):

$$\frac{\Gamma \vdash v_0 \sharp f_0 \to \Gamma^{(1)} \vdash \text{true} \cdots \Gamma^{(k-1)} \vdash v_k \sharp f_k \to \Gamma^{(k)} \vdash \text{true}}{\Gamma \vdash \langle v_0, \ldots, v_k \rangle \sharp \langle f_0, \ldots, f_k \rangle \to \Gamma^{(k)} \vdash \text{true}}[m\text{-}tuple]$$

It is to be mentioned that potential modifications of execution context are propagated through the whole matching process.

Sequences, multisets and dictionaries are defined as shown below:

| | |
|---|---|
| $e ::= [e_0, \ldots, e_k] \mid \{e_0, \ldots, e_k\}$ | (ordered) sequences, multisets |
| $::= \{e_0 = e_0', \ldots, e_k = e_k'\}$ | dictionaries (unordered key/value pairs) |
| $::= [\,] \mid \{\,\} \mid \{=\}$ | empty sequence, multiset, dictionary |
| $f ::= [f_0, \ldots, f_k] \mid \{f_0, \ldots, f_k\}$ | sequence/multiset filters ($k \geq 0$) |
| $\{f_0 = f_0', \ldots, f_k = f_k'\}$ | dictionary filters ($k \geq 0$) | with:

$$\frac{e_i \to e_i'}{[v_0, \ldots, e_i, \ldots, e_k] \to [v_0, \ldots, e_i', \ldots, e_k]} \; [seq]$$

$$\frac{f_i \to f_i'}{[f_0, \ldots, f_i, \ldots, f_k] \to [f_0, \ldots, f_i', \ldots, f_k]} \; [f\text{-}seq]$$

Equivalent equations for sets, called [set], [set2], [f-set] and [f-set2], are strictly similar to the previous one:

$$\frac{e_i \to e_i'}{\{v_0, \ldots, e_i, \ldots, e_k\} \to \{v_0, \ldots, e_i', \ldots, e_k\}} \; [set]$$

$$\frac{f_i \to f_i'}{\{f_0, \ldots, f_i, \ldots, f_k\} \to \{f_0, \ldots, f_i', \ldots, f_k\}} \; [f\text{-}set]$$

When matching sets $S^{[0,k]}$ denotes the set $\{v_0, \ldots, v_k\}$ and $SF^{[0,k]}$ the filter $\{f_0, \ldots, f_k\}$. If $i \in [0,k]$, the $S^{[0,k]-\{i\}}$ is equivalent to $\{v_0, \ldots, v_{i-1}, v_{i+1}, \ldots v_k\}$, and similarly for $SF^{[0,k]-\{i\}}$. Using this notation, the matching over sets is recursively defined as:

$$\exists \, i, j \in [0, k] \text{ such that}$$
$$\frac{\begin{cases} \Gamma \vdash & v_i \,\sharp\, f_j & \to & \Gamma' \vdash true \\ \Gamma' \vdash & S^{[0,k]-\{i\}} \,\sharp\, SF^{[0,k]-\{j\}} & \to & \Gamma'' \vdash true \end{cases}}{\Gamma \vdash S^{[0,k]} \,\sharp\, SF^{[0,k]} \to \Gamma'' \vdash true} \; [m\text{-}set]$$

This equation does not express any ordering in exploring the search space. It just requires that each value in S matches a corresponding filter in SF. Note that the computing environment can be modified throughout matching operations.

Dictionaries are computed by successive evaluation of key/value pairs, following the occurrence order:

$$\frac{e_i \to e_i''}{\{v_0 = v_0', \ldots, e_i = e_i', \ldots, e_k = e_k'\} \to \{v_0 = v_0', \ldots, e_i'' = e_i', \ldots, e_k = e_k'\}} \; [dic]$$

$$\frac{e_i' \to e_i''}{\{v_0 = v_0', \ldots, v_i = e_i', \ldots, e_k = e_k'\} \to \{v_0 = v_0', \ldots, v_i = e_i'', \ldots, e_k = e_k'\}} \; [dic2]$$

Computation of filter dictionaries is strictly similar, and therefore, corresponding equations [f-dic], [f-dic2] will not be shown here.

When matching dictionaries, $D^{[0,k]}$ denotes the dictionary $\{v_0 = V_0', \ldots, v_k = v_k'\}$ and $DF^{[0,k]}$ the filter $\{f_0 = f_0', \ldots, f_k = f_k'\}$. Using this notation, the matching over dictionaries is recursively defined as:

$$\exists \, i, j \in [0, k] \text{ such that}$$
$$\frac{\begin{cases} \Gamma \vdash & v_i \,\sharp\, f_j & \to & \Gamma' \vdash true \\ \Gamma' \vdash & v_i' \,\sharp\, f_j' & \to & \Gamma'' \vdash true \\ \Gamma'' \vdash & D^{[0,k]-\{i\}} \,\sharp\, DF^{[0,k]-\{j\}} & \to & \Gamma''' \vdash true \end{cases}}{\Gamma \vdash D^{[0,k]} \,\sharp\, DF^{[0,k]} \to \Gamma''' \vdash true} \; [m\text{-}dic]$$

This equation does not express any ordering in exploring the search space. It just requires that each key/value pair matches a corresponding filter-key/filter-value pair. Note that the computing environment can be modified throughout matching operations, and that keys are matched prior to values.

Records are unordered and heterogeneous collection of values which can be statically designed by a name called "member". Standard operations on such data structures s are member access, e.g. a:=s.m, or member assignment, e.g. s.m:=10. Record provide useful mnemonics in order to select a part of complex structures and are well known for their expressive richness in data modeling:

| | |
|---|---|
| $e ::= \langle m_0 = e_0, \ldots, m_k = e_k \rangle$ | records (unordered member-name/value pairs) ($k \geq 0$) |
| $f ::= \langle m_0 = f_0, \ldots, m_k = f_k \rangle$ | record filters ($k \geq 0$) |

The reduction of data and filters follows the order of occurrence:

$$\frac{(e_i \to e_i')}{\begin{pmatrix} \langle m_0 = v_0, \ldots, m_i = e_i, \ldots, m_k = e_k \rangle \to \\ \langle m_0 = v_0, \ldots, m_i = e_i', \ldots, m_k = e_k \rangle \end{pmatrix}} \; [e\text{-}rec]$$

Filter records are similarly defined:

$$\frac{f_i \to f_i'}{\begin{array}{l} \langle m_0 = f_0, \ldots, m_i = f_i, \ldots, m_k = f_k \rangle \to \\ \langle m_0 = f_0, \ldots, m_i = f_i', \ldots, m_k = f_k \rangle \end{array}} \; [f\text{-}record]$$

Matching is not order sensitive, i.e. the ordering of filters can differ from the ordering of the subject, but filters are applied through their definition order. Member names must be exactly identical:

$$\exists \text{ distinct } i_0, \ldots, i_k \in [0 \ldots k] \text{ such that}$$
$$\frac{\begin{cases} m_0' = m_{i_0} \text{ and } \Gamma \vdash v_{i_0} \,\sharp\, f_0 \to \Gamma^{(1)} \vdash true \\ \quad \vdots \\ m_k' = m_{i_k} \text{ and } \Gamma^{(k-1)} \vdash v_{i_k} \,\sharp\, f_k \to \Gamma^{(k)} \vdash true \end{cases}}{\Gamma \vdash \langle m_0 = v_0, \ldots, m_k = v_k \rangle \,\sharp\, \langle m_0' = f_0, \ldots, m_k' = f_k \rangle \to \Gamma^{(k)} \vdash true} \; [m\text{-}record]$$

The matching fails if one of the sub-matching fails:

$$\frac{\exists \text{ distinct } i_0, \ldots, i_j \in [0 \ldots k], j \leq k \text{ such that} \begin{cases} m'_0 = m_{i_0} \text{ and } \Gamma \vdash v_{i_0} \sharp f_0 \to \Gamma^{(1)} \vdash \text{true} \\ \vdots \\ m'_j = m_{ij} \text{ and } \Gamma^{(j-1)} \vdash v_{ij} \sharp f_j \to \Gamma^{(j)} \vdash \text{false} \end{cases}}{\Gamma \vdash \langle m_0 = v_0, \ldots, m_k = v_k \rangle \sharp \langle m'_0 = f_0, \ldots, m'_k = f_k \rangle \to \Gamma^{(j)} \vdash \text{false}} \; [m\text{-}record2]$$

Recursive Filters

Recursive filters and the "do" operator will now be described in more detail.

Recursive filters enable the filtering of trees. For instance, e # rec F= <%'plus',F,F> or <%'minus',F,F> or <?> succeeds if e is a tree with nodes that are labeled by strings 'plus' and 'minus' and with leaves that are tuples containing a unique element (of any structure).

The "do" operator takes a filter as the left argument and an instruction (or sequence of instructions) as the right argument. Instructions are executed only if the filter is successful.

For instance, e # <%12,?> do i:=i+1 increments i only if e is a tuple made of two elements, the first one being 12. This operator can be particularly useful in recursive filters.

Using "do" it is possible, for instance, to extract all the numbers from a tree based on the previous example and append them to a list n. The extend filter A is rec F= <%'plus',F,F> or <%'minus',F,F>or (<?x> do n:=n+[x])

In a basic example such as

<'plus',<'minus',<1>,<2>>,<4>> # A where the tree encodes (1−2)+4, the pattern matching operation succeeds and n is equal to n+[1,2,4] after application.

The syntax and operational semantics of recursive filters and the "do" operator is described hereafter:

| | | |
|---|---|---|
| f ::= rec F = f \| F | | recursive filter and recursion variable |
| ::= f do e | | "do" operator (e is executed if f matches) |

As described above, these filters are reduced by preserving their structures. Reduction of the "f do e" filter differs from reduction of the "%e" filter because the embedded expression e is not computed. It will be evaluated in the context of the matching operation, and only if required:

$$\frac{f \to f'}{rec \; F = f \to rec \; F = f'} \; [e\text{-}rec]$$

$$\frac{f \to f'}{f \; do \; e \to f' \; do \; e} \; [e\text{-}do]$$

Recursive matching is defined by using a substitution operation, as e.g. in the standard β-reduction of the lambda calculus:

$$\frac{\Gamma \vdash \upsilon \sharp f[rec \; F = f / F] \to \Gamma' \vdash \text{true/false}}{\Gamma \vdash \upsilon \sharp rec \; F = f \to \Gamma' \vdash \text{true/false}} \; [m\text{-}rec]$$

In the following [m-do], the evaluation of e is done only if the filtering operation is successful. In that case, the new context is used, thus allowing side-effects such as the memorization of useful intermediate information:

$$\frac{\Gamma \vdash \upsilon \sharp f \to \Gamma' \vdash \text{true} \quad \Gamma' \vdash e \twoheadrightarrow \circ \Gamma'' \vdash w}{\Gamma \vdash \upsilon \sharp f \; do \; e \to \Gamma'' \vdash \text{true}} \; [m\text{-}do]$$

$$\frac{\Gamma \vdash \upsilon \sharp f \to \Gamma' \vdash \text{false}}{\Gamma \vdash \upsilon \sharp f \; do \; e \to \Gamma' \vdash \text{false}} \; [m\text{-}do2]$$

For illustration purposes, the technique described above is now applied to an example of managing a database of book references. The data is stored in a Set structure (unordered collection of records) describe hereafter.

```
const DBase = {
    < year = '1994',
        title = 'TCP/IP Illustrated',
        author = [ < last = 'Stevens', first = 'W.' > ],
        publisher = 'Addison-Wesley',
        price = 65.95
    >,
    < title = 'Advanced Programming in the Unix environment',
        year = '1992',
        author = [ < last = 'Stevens', first = 'W.' > ],
        publisher = 'Addison-Wesley',
        price = 65.95
    >,
    < year = '2000',
        title = 'Data on the Web',
        author = [ < last = 'Abiteboul', first = 'Serge' >,
                   < last = 'Buneman', first = 'Peter' >,
                   < last = 'Suciu', first = 'Dan' >
                 ],
        publisher = 'Morgan Kaufmann Publishers',
        price = 39.95
    >,
    < year = '1999',
        title = 'The Economics of Technology and Content for Digital TV',
        editor = < last = 'Gerbarg', first = 'Darcy', affiliation = 'CITI' >,
        publisher = 'Kluwer Academic Publishers',
        price = 129.95
    >
}
```

Now, examples are given to extract, filter and recombine book information by using the filtering primitives and structured pattern constructors.

For finding all books from Addison-Wesley that are published between 1990 and 1999, and for storing the titles, a recursive function F1 is defined that also returns the result in a Set:

```
function F1 (x) is
    if
        x#{ < title=?t,publisher=%'Addison-Wesley',year=%'199'++?>
            ++ ? } ++ ?y
    then
```

```
        return F1 (y) + { < title = t > }
    else
        return {}
```

If F1 is called with the book database as parameter (written F1(DBase)) the result is

```
{ < title = 'Advanced Programming in the Unix environment'
>,
    < title = 'TCP/IP Illustrated' >}
```

The rest of the information is not return in the result, e.g. the authors. The following variation, which is also perhaps more legible, does this job:

```
function F1 (x) is
if
    (x#{?book} ++ ?y) and
    (book#< title=?t,publisher=%'Addison-
Wesley',year=%'199'++? >
        ++ ?)
then
    return F1 (y) + {book}
else
    return { }
```

This last example shows the interest of having explicit filtering operations: the first application is done on the parameter x and the second on "book". The equivalent solution below shows the interest of the "and" filter; the previous "and" is just a standard boolean connective.

```
function F1 (x) is
if
    x#{
        (< title=?t,publisher=%'Addison-Wesley',year=%'199'++?
> ++ ?)
        and ?book
    }++?y
then
    return F1 (y) + {book}
else
    return { }
```

For finding all publishers known in the database, the filters are used in another construction: the "for" loop, has for instance the following syntax for f in e1 do e2 where f is a filter, $e_1$ a computable expression that evaluates to a Set or a Sequence, and $e_2$ any programming statement. This loop applies the filter to all elements of the Set/Sequence, and if successful, executes $e_2$. The solution is then:

for <publisher=?p>++? in DBase do (R := R+{p})

This result of this program is found in R, with R being supposed to be empty before the execution:

```
R = {'Addison-Wesly',
    'Addison-Wesley',
    'Morgan Kaufmann Publishers',
    'Kluwer Academic Publishers'}
```

As can be seen, the Addison-Wesley publisher is repeated twice. One might want to have a real "projection" of the information, and for that, can use an additional filter:

```
for <publisher=?p>++? in DBase do (
    if not (R#{%p}++?) then R:=R+{p}
)
```

The result of this program is as expected:

```
R = {'Addison-Wesly',
    'Morgan Kaufmann Publishers',
    'Kluwer Academic Publishers'}
```

For finding all authors having last names that begin with 'A', the following construction can be used:

```
for <author=?s>++? in DBase do (
    for <last=(%'A'++? and ?auth)>++? in s do (
        if not (R#{%auth}++?) then R := R+{auth}
    )
)
```

The result will be {'Abiteboul'}.

It will be appreciated that the presented pattern matching technique is suitable for either designing programming languages specialized in data structure transformation, or for facilitating extensions to existing languages in order to handle such transformations. The construction of data structures and pattern matching structures, i.e. filters, of arbitrary complexity uses symmetrical constructors, thereby allowing for great simplicity. The definition of basic filters, structured filters, recursive filters and logical combinators provides any programmer with means that have a high expressive power and a good level of simplicity. A boolean operator is provided that allows to apply explicitly the pattern matching structure to the subject data structure. Further, a formal operational semantics is provided that defines precisely the nature of filters and of the matching operation as well the relationship with any associated computational model. Moreover, this formalization offers a flexible theoretical framework that can help further integration.

Bi-Valuation of Programming Statements

Figure 4:
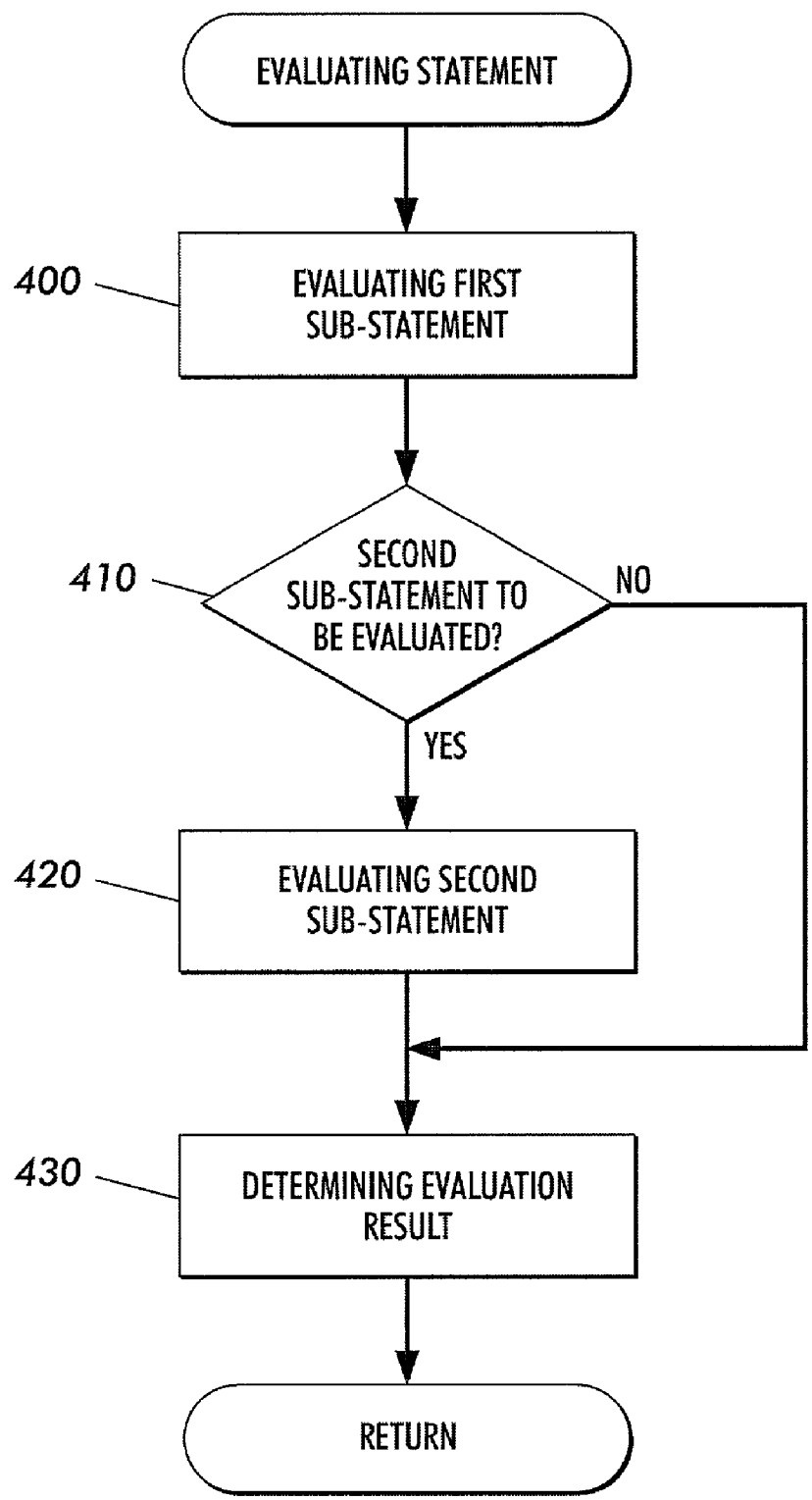
FIG. 4 is a flowchart illustrating the evaluation statement process of the invention.

By means of the statement evaluation section 140, the computer system can perform the process which is depicted in FIG. 4. A programming language statement may include a first and a second sub-statement. In step 400, the first sub-statement is evaluated, and depending on the decision in step 410, the second sub-statement may likewise be evaluated. As will be shown in more detail below, statements exist that require the evaluation of the second sub-statement whereas on the other hand, there are also statements where evaluation of the second sub-statement is not necessary in each case.

When the first and/or the second sub-statement is evaluated in steps 400, 420, an evaluation success result is determined if evaluation succeeds or a distinguished value is returned if evaluation fails. In the following discussion, the distinguished value is noted "none".

The provision of a distinguished value in addition to the set of possible evaluation success results is called bi-valuation.

The bi-valuation technique makes it possible to combine imperative and declarative statements in one programming language. Basically, both imperative and declarative statements are evaluated when executed and either return "unit", a value, or "none". The value "unit" is returned for imperative statements since imperative statements always succeed. A value is returned for declarative statements which succeed, and for declarative statements which fail return "none".

It is therefore possible to combine both kinds of statements using so-called imperative connectors, like "Then" or "Else" having semantics that are based on the evaluation of the statements. Conditional, imperative, declarative statements and imperative connectors are described below in more detail. Further, it is demonstrated how imperative connectors are used for mixing statements.

In the following, s and $s_i$ denote one or more imperative and/or declarative statements combined together by imperative connectors. The term 'to evaluate s' means 'to execute the statements in s and return the evaluation of the last statement in s'. Expressions like e, $e_i$ can be literal constants, variables or basic operations like e+e, e*e.

Conditional statements, or if-then-else statements, are noted if (e) then ($s_1$) else ($s_2$)

where e is a boolean expression. Depending on whether e evaluates to true or false, $s_1$ or $s_2$ is evaluated, respectively.

As opposed to declarative statements, imperative statements always succeed, and evaluate to "unit". One example is the assignment, noted x:=e, where x is a variable identifier and e is an expression. It assigns the result of the evaluation of e to x. Another example is the closure loop, noted *(s). The loop ends when s evaluates to "none". Its semantics is as follows:

if (s != none) then *(s) else unit

Declarative statements are based on conditions. The evaluation of a declarative statement returns a value if the condition(s) is verified, "none" otherwise. Examples are rules, ordered action systems and unordered action systems.

The Rule is noted e→s where condition e can be a boolean or a pattern-matching expression. If the condition is verified, meaning that the pattern has been matched or that the boolean expression has evaluated to true, then the rule fires, triggering the evaluation of the right hand side s. Rules are commonly used in rewriting systems by combining them in constructs similar to action systems.

The (ordered) action system is noted [|$s_1$, $s_2$, ..., $s_n$|] and can be compared with a powerful Switch construct. It is used to combine rules. The action system evaluates them one by one until it finds one that does not evaluate to "none", i.e. a rule which fires and that has right hand side statements that do not evaluate to "none". The action system itself returns the result of the evaluation of these statements. Action systems can also contain an imperative statement in the last position which will act as a default case since imperative statements always return "unit".

The unordered action system is noted {|$s_1$, $s_2$, ..., $s_n$|} and does not guarantee the order of evaluation of rules, i.e. the order of declaration has not semantic meaning.

There are three imperative connectors which make it possible to mix imperative and declarative statements. An example set of imperative connectors is given below:

The sequencing operation ";" separates instructions that are to be executed in sequence.

$s_1; s_2; \ldots; s_n$ will execute every statement and return the evaluation of $s_n$.

The concurrent operators $\|^\wedge$ and $\|^\vee$ separate instructions that are to be executed concurrently. They have respectively logical-And-like and logical-Or-like semantics. Basically, $s_1\|^\wedge s_2$ concurrently evaluates $s_1$ and $s_2$ returning "none" when at least one of the $s_i$ evaluates to "none"; "unit" is returned when both operands evaluate to "unit". $s_1\|^\vee s_2$ behaves in the following way: it concurrently evaluates $s_1$ and $s_2$ returning "unit" when at least one of the $s_i$ evaluates to "unit", and returning "none" when both operands evaluate to "none". A more formal definition of the semantics is provided below.

The Else operator $s_1$ Else $s_2$ evaluates $s_1$. If $s_1$ evaluates to "none", then $s_2$ is evaluated. The semantics is as follows:

var $v_f=s_1$. if ($v_f$ == none) then $s_2$ else $v_f$.

$v_f$ is a fresh variable, i.e. doesn't occur in the current context nor in $s_1$ or $s_2$.

The Then operator $s_1$ Then $s_2$ evaluates $s_1$. If $s_1$ does not evaluate to "none", then $s_2$ is evaluated. The semantics is as follows:

if ($s_1$ != none) then ($s_2$) else (none)

The Or operator $s_1$ Or $s_2$ evaluates $s_1$. If $s_1$ evaluates to "none", the evaluation of $s_2$ is returned. If $s_1$ evaluates to "unit", $s_2$ is still evaluated but "unit" is returned, no matter what $s_2$ evaluates to. The semantics is as follows:

if ($s_1$ == none) then ($s_2$) else($s_2$ ; unit).

The And operator $s_1$ And $s_2$ evaluates $s_1$. If $s_1$ evaluates to "unit", the evaluation of $s_2$ is returned. If $s_1$ evaluates to "none", $s_2$ is still evaluated but "none" is returned. The semantics is as follows:

if ($s_1$ != none) then ($s_2$) else ($s_2$ ; none)

For operators And, Or, $\|^\wedge$ and $\|^\vee$, $s_1$ and $s_2$ have to evaluate to "unit" or "none", meaning that they have to be imperative expressions.

Some introductory examples are now provided to get familiar with the notation, and then the expressiveness brought by the technique is demonstrated with more complex examples. Variables i and str1 are supposed to be respectively of type Integer and String.

A simple sequence is made of an assignment statement followed by a "while" loop containing a rule: this loop increments i until it reaches 10.

i :=0;
*((i<10)→i:=i+1)

In an action system containing a rule, a nested action system is made of rules and an expression:

[|
    (i<5) → (str1 := 'cir' ; 50 − 3),
    [|
        (i == 100) → 'abcd',
        (i == 200) → 'efgh'
    |],
    3.1415
|]

If i is less than 5, then str1 is assigned the string 'cir' and the action system returns 47. Otherwise, if i is equal to 100 or 200, the action system respectively returns strings 'abcd' or 'efgh'.

Otherwise, it returns 3.1415. This last expression acts as a 'default' case. If it were not present and if i was not previously assigned a value less than 5 or equal to 100 or 200, the action system would have evaluated to "none".

It is to be noted that action system components do not necessarily contain a simple expression like 50-3 or 'abcd' as the last statement. They can also contain imperative expressions; in that case, the action system returns "unit".

The next more complex example makes use of the pattern matching features described above. Basically, pattern matching expressions can be used in place of boolean expressions in the left hand side of rules; they enable the recognition of patterns and extraction of parts of a data structure. A pattern matching expression evaluates to true if the subject matches and then the rule fires. Otherwise it evaluates to false and the rule returns "none".

In the present example, some structural data about an XML file stored in string variable str1 are extracted. To this end, several numeric variables are created which will count:

| | |
|---|---|
| nb_open_tags | number of openings tags |
| nb_close_tags | number of closing tags |
| nb_emp-tags | number of empty tags |
| nb-prefixed_tags | number of prefixed tags (the prefix represents a namespace) |
| nb_xrce_tags | number of tags having the name 'xrce' |
| nb_other_tags | number of tags which do not have a prefix and are not labeled 'xrce' |

The first three tests identify the kind of the encountered tag, i.e. opening, closing, empty, whereas the three others examine the content of that tag. Since the last three tests are independent from the previous ones and relevant only when a new tag is encountered, the tests are split in two action systems combined with a Then connector. The variable tags is a string in which each tag name is appended. When all tags have been tested, the results are displayed.

```
*(
    [|
        str1 # ? ++ %' <' ++ ?str2 ++ %' >' ++ ?str1 →
            nb_open_tags := nb_open_tags+1,
        str1 # ? ++ %' </' ++ ?str2 ++ %' >' ++ ?str1 →
            nb_close_tags := nb_close_tags+1,
        str1 # ? ++ %' <' ++ ?str2 ++ %'/>' ++ ?str1 →
            nb_emp_tags := nb_emp_tags+1
    |]
    Then
    [|
        str2 # ? ++ %' :' ++ ? →
            nb_prefixed_tags := nb_prefixed_tags + 1,
        str2 # %' xrce' → nb_xrce_tags := nb_xrce_tags + 1,
            nb_other_tags := nb_other_tags + 1
    |]
    Then
    (tags := tags + str2)
);
print('number of opening tags :' +str(nb_open_tags)) ;
print('number of closing tags :' +str(nb_close_tags)) ;
print('number of empty tags :' +str(nb_emp_tags)) ;
print('number of prefixed tags :' +str(nb_prefixed_tags)) ;
print('number of xrce tags :' +str(nb_xrce_tags)) ;
print('number of other tags :' +str(nb_other_tags)) ;
print (tags)
```

In this example, an action system, i.e. a declarative statement, is composed with another action system and with an assignment instruction, i.e. an imperative statement, and the three are nested in a closure loop, i.e. an imperative statement.

To illustrate the compactness and readability provided by the proposed technique, the same program coded with only the closure loop and if-then-else statements is presented in the following. For simplicity purposes, it is assumed that boolean expressions in conditions can be replaced by pattern-matching expressions.

```
*(
    if (length(str1) > 0) then (
        if (str1 # ? ++ %' <' ++ ?str2 ++ %' >' ++ ?str1) then (
            if (str2 # ? ++ %' :' ++ ?) then (
                nb_open_tags := nb_open_tags + 1;
                nb_prefixed_tags := nb_prefixed_tags + 1
            )
            else (
                if (str2 # %' xrce' ++ ?) then (
                    nb_open_tags := nb_open_tags + 1;
                    nb_xrce_tags := nb_xrce_tags + 1
                )
                else (
                    nb_open_tags := nb_open_tags + 1;
                    nb_other_tags := nb_other_tags + 1
                )
            );
            tags := tags + str2
        )
        else (
            if (str1 # ? ++ %' </' ++ ?str2 ++ %' >' ++ ?str1) then
            (
                if (str2 # ? ++ %' :' ++ ?) then (
                    nb_close_tags := nb_close_tags + 1;
                    nb_prefixed_tags := nb_prefixed_tags + 1
                )
                else (
                    if (str2 # %' xrce' ++ ?) then (
                        nb_close_tags := nb_close tags + 1;
                        nb_xrce_tags := nb_xrce_tags + 1
                    )
                    else (
                        nb_close_tags := nb_close tags + 1;
                        nb_other_tags := nb_other tags + 1
                    )
                );
                tags := tags + str2
            )
            else (
                if (? ++ %' <' ++ ?str2 ++ %' />' ++ ?str1) then (
                    if (str2 # ? ++ %' :' ++ ?) then (
                        nb_emp_tags := nb_emp_tags + 1;
                        nb_prefixed_tags := nb_prefixed_tags + 1
                    )
                    else (
                        if (str2 # %' xrce' ++ ?) then (
                            nb_emp_tags := nb_emp_tags + 1;
                            nb_xrce_tags := nb_xrce_tags + 1
                        )
                        else (
                            nb_emp_tags := nb_emp_tags + 1;
                            nb_other_tags := nb_other_tags + 1
                        )
                    );
                    tags := tags + str2
                )
            )
        )
        else (none)
    );
    print('number of opening_tags :' +str(nb_open_tags)) ;
    print('number of closing_tags :' +str(nb_close tags)) ;
    print('number of empty_tags :' +str(nb_emp_tags)) ;
    print('number of prefixed_tags :' +str(nb_prefixed_tags)) ;
    print('number of xrce_tags :' +str(nb_xrce_tags)) ;
    print('number of other_tags :' +str(nb_other_tags)) ;
    print (tags)
```

Using if-then-else statements, 3×3=9 cases have to be dealt with separately. In languages like C or Java, a Switch construct would have produced a more readable solution, but unfortunately, Switch can only be used with primary integer and char/byte types, and test values have to be statically defined.

It will be appreciated that the above described technique enables the definition of basic imperative and declarative statements, the combination of both kinds of operations in meaningful and arbitrarily complex control structures, and the typing of such constructions.

Main applications are language construction, refining control abstractions and programming models toward more computational expressiveness, rewriting systems theory, classical conditional term rewriting systems, explicit strategies, transformation languages and systems for compilation and language processing, structured document transformation, tree pattern matching, event management, explicit or automatic document transformation systems, and others.

The technique provides material for building languages which are less abstract and more general than rewriting systems but abstract enough to simplify and extend general purpose programming languages. The technique could hence play an important role in the design of new transformation techniques or the extension of existing ones. Further, the technique may solve data and document interchange problems which will lead to low costs and high quality solutions.

Moreover, the technique provides a programming language framework through the definition of generic syntactic constructs, their operational semantics and the associated formal type system. The important difficulties which underlie the ambitious goal of bringing together declarative and imperative programming styles are solved all together, in a conceptually new and generic approach.

It will be appreciated that the bi-valuation technique enables and complements the symmetrical structural pattern matching technique that has been described above. The technique is further particular suited for supporting general typing mechanisms. Type checking improves the global reliability of programming languages, and provides efficient means for optimization, thus, increasing the runtime performance. This will be described in more detail below.

By means of bi-valuation of programming statements, and by using imperative connectors, the design of new programming languages or the extension of existing programming languages are rendered possible with constructions that provide innovative expressiveness. Resulting languages are located at an intermediate level of abstraction, between declarative, functional and imperative languages. This kind of abstraction could play an important role in general structure transformation technologies. When building modern programming languages with adequate control abstraction level, the major difficulty is to find the best trade-off between simplicity and power, conciseness and expressiveness. It will therefore be appreciated that the present technique provides programming constructs in such a way that the constructs offer compositional capabilities. Further, connectors are provided that allow the composition of such constructs with relevant semantics. Further, a sound type system is provided which enables to check out composition errors.

Statement Evaluation Syntax and Operational Semantics

In the following, the syntax and semantics of the basic conditional and imperative constructs are described in more detail.

In the testing operation, environment modifications are allowed during evaluation of the boolean part. This enables the use of complex operations with effects on context as a condition for the test:

$$\frac{\Gamma \vdash e_1 \rightarrow \Gamma' \vdash e_1'}{\begin{array}{l}\Gamma \vdash \text{if } e_1 \text{ then } e_2 \text{ else } e_3 \rightarrow \\ \Gamma' \vdash \text{if } e_1' \text{ then } e_2 \text{ else } e_3\end{array}} \quad [if]$$

if true then $e_2$ else $e_3 \rightarrow e_2$ [if1]
if false then $e_2$ else $e_3 \rightarrow e_3$ [if2]

The sequencing operator is defined as shown hereafter:

$$\frac{\Gamma \vdash e_1 \rightarrow \Gamma' \vdash e_1'}{\Gamma \vdash e_1; e_2 \rightarrow \Gamma' \vdash e_1'; e_2} \quad [seq1]$$

$$\frac{e_1 \rightarrow \circ \; \upsilon}{e_1; e_2 \rightarrow e_2} \quad [seq2]$$

Further, an assignment operator is provided that finally reduces to a distinguished value "unit". In the prior art, similar mechanisms for typing imperative statements exist for integrating imperative extensions in the functional framework. However, the result of such an assignment operation x:=e is just the result of the expression e itself:

$$\frac{\Gamma \vdash e \rightarrow \Gamma' \vdash e'}{\Gamma \vdash x := e \rightarrow \Gamma' \vdash x := e'} \quad [assg1]$$

$$\frac{e \rightarrow \circ \; \upsilon}{\Gamma, x^w \vdash x := e \rightarrow \Gamma, x^\upsilon \vdash \text{unit}} \quad [assg2]$$

Moreover, an iterative construct is provided in the form of a closure operator, noted *(e), which allows to iterate an action e until it evaluates to a distinguished value "none". Thus, this action must be a declarative action, since applying the closure to a pure imperative action like an assignment would produce endless computation. This property is checked by the typing rules described below. The semantics of the * operator is simply defined by

*(e)→if (e!=none) then *(e) else unit [*]

A closure operation, returning always the distinguished value "unit", is considered as a pure imperative (mono-valuated) statement.

Declarative constructs are defined as shown hereafter:

| | |
|---|---|
| e ::= e ⇒e' | rule |
| [\|e_1, ..., e_n\|] | action system (ordered) |
| {\|e_1, ..., e_n\|} | action system (unordered) |

As mentioned above, the first universal construction is the rule, constituted of a left-hand condition and a right-hand action executed only if the condition can be verified. The proposed syntax, and the following type system, allows the cascading of rules of the form $e_1 \Rightarrow e_2 \Rightarrow e_3$, understood as $e_1 \Rightarrow (e_2 \Rightarrow e_3)$:

$e_1 \Rightarrow e_2 \rightarrow$ if ($e_1$==true) then $e_2$ else none [Rule]

In declarative environments, such rules are usually assembled in larger systems. The rule choice and application strategy varies a lot depending on the various proposed models, but most common tactics are "try rules in order" or "try and rule" and "iterate application as much as possible". These standard models, and more sophisticated tactics as well, are easily emulated by combining the action systems with the closure operator presented above.

The ordered action system consists of a succession of actions to be tried in the given order. In the following definition, $v_f$ denotes a "fresh" variable, i.e with a unique name:

$$n \geq 2 \ [|e_1, \ldots, e_n|] \rightarrow \begin{bmatrix} \text{var } v_f = e_1. \\ \text{if}(v_f == \text{none}) \\ \text{then}[|e_2, \ldots, e_n|] \\ \text{else } v_f \end{bmatrix} [Asys1]$$

$$[|e|] \rightarrow e \ [Asys2]$$

It is to be noted that this definition implies that all actions $e_1, \ldots, e_{n-1}$ must be bi-valuated, i.e possibly evaluated to "none"; the last one can be mono-valuated. In that case the whole system becomes itself mono-valuated, since a value different from "none" will be finally returned.

Unordered action systems as similarly defined, up to the (random) choice of action $e_i$ among all others:

$$n \geq 2, i \in \{1, \ldots, n\} \{|e_1, \ldots, e_n|\} \rightarrow$$

$$\begin{bmatrix} \text{var } v_f = e_i, \\ \text{if}(v_f == \text{none}) \\ \text{then}\{|e_1, \ldots, e_{i-1}, e_{i+1}, \ldots, e_n|\} \\ \text{else } v_f \end{bmatrix} [Asysb1]$$

$$\{|e|\} \rightarrow e \ [Asysb2]$$

One consequence of this definition is that here, all actions must be bi-valuated, in the sense given above. Such an action system specifies permutation equivalent rule collection, allowing great perspectives for run-time optimizations. Moreover, it allows the programmer to avoid producing overspecified code, making the code more understandable to external code reviewers or maintainers.

Turning now to the imperative connectors, the terminology "imperative connector" has been chosen by reference to the so-called "Boolean connectors", in order to underline the similarity. In both cases, values are bi-valuated. But the present, more subtle approach to the valuation domains allows to handle several data sets.

The first useful connector is the well-known sequence ";" already presented.

Another useful set of operators are concurrent execution (binary) operators, noted $e_1 \|^{\wedge} e_2$ and $e_1 \|^{v} e_2$, and also $e_1 \|^{*} e_2$ for both, equipped with the following interleaving semantics:

$$\frac{\Gamma \vdash e_1 \rightarrow \Gamma' \vdash e_1'}{\Gamma \vdash e_1 \|^{*} e_2 \rightarrow \Gamma' \vdash e_1' \|^{*} e_2} \ [ParL]$$

$$\frac{\Gamma \vdash e_2 \rightarrow \Gamma' \vdash e_2'}{\Gamma \vdash e_1 \|^{*} e_2 \rightarrow \Gamma' \vdash e_1 \|^{*} e_2'} \ [ParR]$$

The first operator $\|^{\wedge}$, besides its concurrent semantics, behaves like a logical "and", commonly noted ^, with respect to the management of the bi-valuation:

unit $\|^{\wedge} e_2 \rightarrow e_2$ [Par1a] none $\|^{\wedge} e_2 \rightarrow e_2$; none [Par1b]
$e_1 \|^{\wedge}$ none $\rightarrow e_1$; none [Par1c] $e_1 \|^{\wedge}$ unit $\rightarrow e_1$ [Par1d]

With $\|^{v}$, the equivalent "or" behavior, commonly noted v, is expressed:

unit $\|^{v} e_2 \rightarrow e_2$; unit [Par2a] none $\|^{v} e_2 \rightarrow e_2$ [Par2b]
$e_1 \|^{v}$ none $\rightarrow e_1$ [Par2c] $e_1 \|^{v}$ unit $\rightarrow e_1$; unit [Par2d]

This definition describes a simple concurrent semantics, that can be extended to a wider scope. The important point here is to define this concurrent composition as a bi-valuated statement consistent with the global framework.

Besides concurrent imperative connectors, there are also provided sequential imperative connectors, Then, Else, And and Or.

Then and Else are defined by:
$e_1$ Then $e_2 \rightarrow$ if $(e_1 !=$ none) then $e_2$ else none [Then]
$e_1$ Else $e_2 \rightarrow$ var $v_f = e_1$. if $(v_f ==$ none) then $e_2$ else $v_f$ [Else]

$v_f$ is a fresh variable, i.e. doesn't occur in the current context nor in $e_1$ or $e_2$. The following And and Or operators are quite similar, except that they impose the evaluation of both operands whatever result is computed. Another difference is that values computed by both operands can only range over {unit, none}. In that sense, $e_1$ and $e_2$ are imperative expressions:

$e_1$ And $e_2 \rightarrow$ if $(e_1 !=$ none) then $e_2$ else $(e_2;$ none) [And]
$e_1$ Or $e_2 \rightarrow$ if $(e_1 ==$ none) then $e_2$ else $(e_2;$ unit) [Or]

Type System

Figure 5:
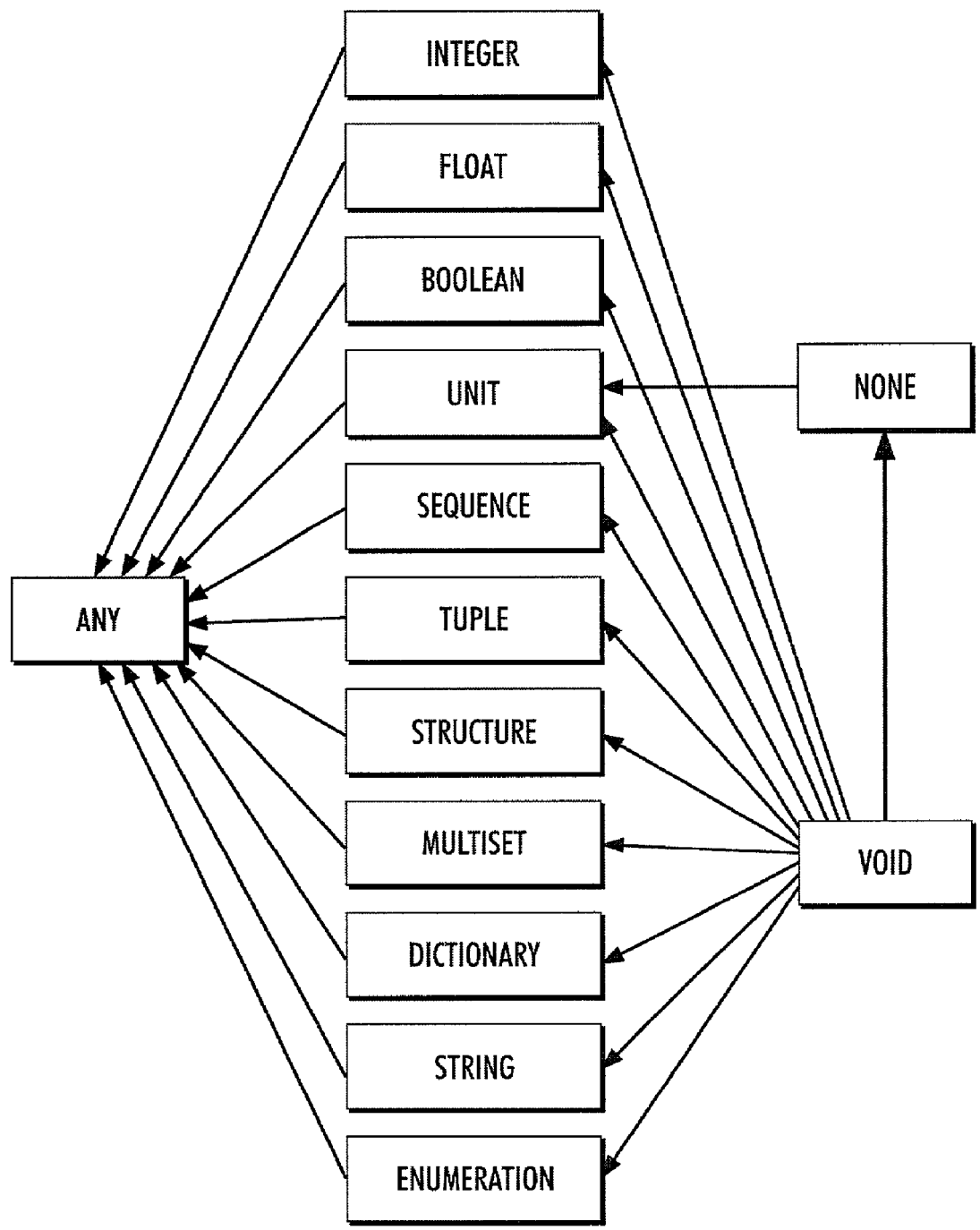
FIG. 5 illustrates an example of the hierarchy of types in a programming language based on the techniques of the invention.

A minimal, formal, type system that illustrates and enables the use of the constructs is described hereafter. This type system is based on a subtyping relation using inclusion polymorphism brought by a non-discriminating union type constructor. An example of a type hierarchy is shown in FIG. 5.

The type system introduces other relevant tools, when required, to known techniques for building type systems. It is described through "typing judgments" logically organized by means of "typing equations".

The typing judgement $\gamma \triangleright e : t$ states that expression $e$ has type $t$ in the typing context $\gamma$. The notion of $\gamma \triangleright t \preccurlyeq t'$ asserts that type $t$ is a sub-type of type $t'$ and a more original judgement $\gamma \triangleright e :: t$, says that the expression $e$ has minimal type $t$. Formally, this last relation is characterized by the following property:

(Minimal type) $\gamma \triangleright e :: t$ iff $\forall t', \gamma \triangleright e : t' \Rightarrow \gamma \triangleright t \preccurlyeq t'$ This notion of minimal type is useful in order to avoid overgeneralized inferences due to the so called subsumption rule (see [Sub]), while preserving the convenience of subtyping mechanism. The notation $\gamma, x : t \triangleright \ldots$ expresses that the fact that "x is a variable of type t" is registered in the typing context. More precisely, $\gamma, x : t$ is a typing context $\gamma'$ such that $\gamma' = \gamma \cup \{x:t\}$. The following rules define the reflexive and transitive subtyping relation $\preccurlyeq$ for all well-formed types $t, t', t_1, t_2, t_3$ and the typing context $\gamma$.

$$\gamma \triangleright t \preccurlyeq t \ [Refl]$$

$$\frac{\gamma \triangleright t_1 \preccurlyeq t_2 \ \gamma \triangleright t_2 \preccurlyeq t_3}{\gamma \triangleright t_1 \preccurlyeq t_3} [Trans]$$

$$\frac{\gamma \triangleright e :: t}{\gamma \triangleright e : t} [Min]$$

$$\frac{\gamma \triangleright e : t \ \gamma \triangleright t \preccurlyeq t'}{\gamma \triangleright e : t'} [Sub]$$

$$\frac{\gamma \triangleright t_1 \preccurlyeq t \ \gamma \triangleright t_2 \preccurlyeq t}{\gamma \triangleright t_1 | t_2 \preccurlyeq t} [U1]$$

$$\frac{\gamma \triangleright t \preccurlyeq t_1}{\gamma \triangleright t \preccurlyeq t_1 | t_2} [U2]$$

$$\frac{\gamma \triangleright t \preccurlyeq t_2}{\gamma \triangleright t \preccurlyeq t_1 | t_2} [U3]$$

Rules for defining well-formedness conditions on types will not be shown, and types are supposed well formed in all following definitions. An important type constructor is the non-discriminating union which provides inclusion polymorphism.

Basic typing of literals and variables is defined by the following axioms:

$\emptyset \triangleright n :: int$ [Num] $\emptyset \triangleright s :: string$ [Str] $\gamma, x:t \triangleright x :: t$ [Var]

$\emptyset \triangleright true :: bool$ [Bool1] $\emptyset \triangleright false :: bool$ [Bool2]

$\emptyset \triangleright none :: None$ [None] $\emptyset \triangleright unit :: Unit$ [Unit]

Operators are typed by:

$$* \in \{+, *, -, /\}$$

$$\frac{\gamma \triangleright e_1 : int \quad \gamma \triangleright e_2 : int}{\gamma \triangleright e_1 * e_2 :: int} [Add1]$$

$$\frac{\gamma \triangleright e_1 : string \quad \gamma \triangleright e_2 : string}{\gamma \triangleright e_1 + e_2 :: string} [Add2]$$

$$\frac{\gamma \triangleright e_1 : t \quad \gamma \triangleright e_2 : t'}{\gamma \triangleright e_1 == e_2 :: bool} [Eq]$$

$$\frac{\gamma \triangleright e_1 : t \quad \gamma \triangleright e_2 : t'}{\gamma \triangleright e_1 \ != e_2 :: bool} [Neq]$$

$$\frac{\gamma \triangleright e : bool \quad \gamma \triangleright e_1 :: t_1 \quad \gamma \triangleright e_2 :: t_2}{\gamma \triangleright if \ e \ then \ e_1 \ else \ e_2 :: t_1|t_2} [If]$$

$$\frac{x \notin dom(\gamma) \quad \gamma \triangleright e_1 : t \quad \gamma, e_1 : t \triangleright e_2 :: t_2}{\gamma \triangleright var \ x = e_1 \cdot e_2 :: t_2} [Var]$$

It is to be noted that [Eq,Neq] do not impose operands to have the same common type. That is, equality comparisons are applicable to every kind of data.

Other basic constructs can be typed through:

$$\frac{\gamma \triangleright e_1 : Unit|None \quad \gamma \triangleright e_2 :: t_2}{\gamma \triangleright e_1; e_2 :: t_2} [Seq]$$

$$\frac{\gamma \triangleright x :: t \quad \gamma \triangleright e : t}{\gamma \triangleright x := e :: Unit} [Assg]$$

$$\frac{\gamma \triangleright e :: Unit|None}{\gamma \triangleright *(e) :: Unit} [Clos]$$

Concurrent connectors are always bi-valuated imperatives:

$$\frac{\gamma \triangleright e_1 :: Unit|None \quad \gamma \triangleright e_2 : Unit|None}{\gamma \triangleright e_1 \|^\wedge e_2 :: Unit|None} [ParAnd]$$

$$\frac{\gamma \triangleright e_1 :: Unit|None \quad \gamma \triangleright e_2 : Unit|None}{\gamma \triangleright e_1 \|^\vee e_2 :: Unit|None} [ParOr]$$

The following equations achieve very precise type control for "and-like" concurrency:

$$\frac{\gamma \triangleright e_1 : Unit \quad \gamma \triangleright e_2 : Unit}{\gamma \triangleright e_1 \|^\wedge e_2 :: Unit} [ParAnd1]$$

$$\frac{\gamma \triangleright e_1 : None \quad \gamma \triangleright e_2 : Unit|None}{\gamma \triangleright e_1 \|^\wedge e_2 :: None} [ParAnd2]$$

Similarly, for "or-like" concurrence:

$$\frac{\gamma \triangleright e_1 : None \quad \gamma \triangleright e_2 :: None}{\gamma \triangleright e_1 \|^\vee e_2 :: None} [ParOr1]$$

$$\frac{\gamma \triangleright e_1 : Unit \quad \gamma \triangleright e_2 : Unit|None}{\gamma \triangleright e_1 \|^\vee e_2 :: Unit} [ParOr2]$$

$$\frac{\gamma \triangleright e_1 : None|Unit \quad \gamma \triangleright e_2 : Unit}{\gamma \triangleright e_1 \|^\vee e_2 :: Unit} [ParOr3]$$

Sequential connectors are defined by, for some t, t':

$$\frac{\gamma \triangleright e_1 :: Unit|None \quad \gamma \triangleright e_2 :: t}{\gamma \triangleright e_1 \ Then \ e_2 :: t|None} [Then]$$

$$\frac{\gamma \triangleright e_1 :: t|None \quad \gamma \triangleright e_2 :: t'}{\gamma \triangleright e_1 \ Else \ e_2 :: t \mid t'} [Else]$$

$$\frac{\gamma \triangleright e_1 :: Unit|None \quad \gamma \triangleright e_2 :: Unit|None}{\gamma \triangleright e_1 \ And \ e_2 :: Unit|None} [And]$$

$$\frac{\gamma \triangleright e_1 :: Unit|None \quad \gamma \triangleright e_2 :: Unit|None}{\gamma \triangleright e_1 \ Or \ e_2 :: Unit|None} [Or]$$

Beyond these last two equations, as for concurrent connectors, much more precise type checking is provided in order to detect composition errors:

$$\frac{\gamma \triangleright e_1 :: None \quad \gamma \triangleright e_2 : Unit|None}{\gamma \triangleright e_1 \ And \ e_2 :: None} [And1]$$

$$\frac{\gamma \triangleright e_1 :: Unit|None \quad \gamma \triangleright e_2 :: None}{\gamma \triangleright e_1 \ And \ e_2 :: None} [And2]$$

$$\frac{\gamma \triangleright e_1 :: Unit \quad \gamma \triangleright e_2 :: Unit}{\gamma \triangleright e_1 \ And \ e_2 :: Unit} [And3]$$

$$\frac{\gamma \triangleright e_1 :: Unit \quad \gamma \triangleright e_2 : Unit|None}{\gamma \triangleright e_1 \ Or \ e_2 :: Unit} [Or1]$$

$$\frac{\gamma \triangleright e_1 :: Unit|None \quad \gamma \triangleright e_2 :: Unit}{\gamma \triangleright e_1 \ Or \ e_2 :: Unit} [Or2]$$

$$\frac{\gamma \triangleright e_1 :: None \quad \gamma \triangleright e_2 : None}{\gamma \triangleright e_1 \ Or \ e_2 :: None} [Or3]$$

The relevance of the typing approach described above with respect to the semantics of the language constructs described above is now demonstrated in more detail.

The soundness property is to prove that a well typed construct cannot produce an error during evaluation. More precisely, it establishes the conservation of the well typed property: any well typed expression remains well typed over all possible computation steps. One preliminary step is to define a logical relation between the typing context and the execution environment:

The execution environment $\Gamma$ is conform with respect to the typing context $\gamma$ (noted $\gamma \vdash \Gamma$):

$\gamma \vdash \Gamma$ iff $\forall x^\nu \in \Gamma, \gamma \triangleright x :: t \ \hat{} \ \emptyset \triangleright v :: t$ In the following, e is understood as a non-reduced syntactic expression. The type is preserved during reduction:

$$\forall t, \gamma, \Gamma \quad \gamma \vdash \Gamma \text{ and } \gamma \triangleright e : t \Rightarrow \begin{cases} \Gamma \vdash e \rightarrow \Gamma' \vdash e' \\ \gamma \triangleright e' : t \\ \gamma \vdash \Gamma' \end{cases}$$

The proof presents no particular difficulty; it uses an induction on the structure of e.

The completeness property states that all derivations, i.e. computation steps, defined by the operational semantics is covered by the type control mechanism. Completeness is defined by:

$$\forall e, \gamma, \Gamma s.t. \gamma \mid \vdash \Gamma \quad \Gamma \vdash e \rightarrow \Gamma' \vdash e' \Longrightarrow \exists t \text{ such that } \begin{cases} \gamma \triangleright e : t \\ \gamma \triangleright e' : t \\ \gamma \mid \vdash \Gamma' \end{cases}$$

As for the preservation of type, the proof presents no particular difficulty; it uses an induction on the structure of e.

Using the foregoing specification, the invention may be implemented as a machine (or system), process (or method), or article of manufacture by using standard programming and/or engineering techniques to produce programming software, firmware, hardware, or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

The invention has been described with reference to particular embodiments. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A program stored on a computer-readable medium that causes a computer to execute steps to determine whether a computer-storable expression matches a filter, comprising:
   identifying and testing the structural form of the expression;
   choosing a transformation model for the filter that is compatible with the structural form of the expression;
   evaluating a first code structure representing the expression to determine a value of said expression prior to filtering;
   analyzing a second code structure representing the filter to determine the characteristics of the filter,
   wherein the second code structure comprises a plurality of filter characteristics corresponding to a plurality of structural forms of the first code structure, the plurality of structural forms comprising text, trees, and graphs, and
   wherein the second code structure applies a filter corresponding to the structural form of the first code structure; and
   filtering said evaluated value according to the filter characteristics,
   wherein said first code structure is constructed from a plurality of first programming language code structure elements and said second code structure is constructed from a plurality of second programming language code structure elements, each second structure element being symmetrically constructed to correspond to one of said first structure elements, and
   wherein evaluating, analyzing and filtering are performed upon explicit invocation of a matching operator, and filtering comprises returning a boolean evaluation result value.

2. The computer-readable medium of claim 1, wherein the first code structure and the second code structure are part of a compiler programming language code.

3. The computer-readable medium of claim 1, wherein the second code structure includes at least one composition operator acting as a logical connector for logically combining two of said programming language code structure elements, or for inverting the boolean value of at least one of said second programming language code structure elements.

4. The computer-readable medium of claim 1, wherein the first code structure includes a first concatenation operator for concatenating two expressions, and the second code structure includes a second concatenation operator for concatenating two filter elements, the first and the second concatenation operators being applied within the first code structure and the second code structure, respectively, in essentially the same manner.

5. The computer-readable medium of claim 1, wherein the first and the second code structures include indicator elements indicating a data type, the indicator elements acting as structure constructors in the first code structure and as filter constructors in the second code structure, each of the structure constructors corresponding to a respective one of the filter constructors.

6. The computer-readable medium of claim 1, wherein the second code structure includes a test operator having an operand, and wherein filtering comprises testing the occurrence of the value of said operand in the expression.

7. The computer-readable medium of claim 1, wherein the second code structure includes an existence operator that matching any element that exists.

8. The computer-readable medium of claim 1, wherein the second code structure includes an assignment operator having an operand, to assign a part of the expression to a variable that is identified by said operand.

9. The computer-readable medium of claim 1, wherein the second code structure includes a Kleene operator.

10. The computer-readable medium of claim 1, wherein the second code structure includes a do operator having two arguments, one argument being a filter and the other argument being an instruction or a sequence of instructions, wherein filtering includes executing the instructions only if the filter is successful.

11. The computer-readable medium of claim 1, wherein the filter is a recursive filter enabling filtering of trees.

12. The computer-readable medium of claim 1, wherein the filter is a normalized filter.

13. The computer-readable medium of claim 1, wherein filtering includes modifying the environment of the computer system, the environment including variables and corresponding values used by the computer system when filtering said value of said expression.

14. The computer-readable medium of claim 1, wherein the first code structure and the second code structure are part of an interpreter programming language code.

* * * * *